(12) United States Patent
Shibata

(10) Patent No.: US 10,627,110 B2
(45) Date of Patent: Apr. 21, 2020

(54) COMBUSTOR COOLING PANEL, TRANSITION PIECE AND COMBUSTOR INCLUDING THE SAME, AND GAS TURBINE INCLUDING COMBUSTOR

(71) Applicant: MITSUBISHI HITACHI POWER SYSTEMS, LTD., Kanagawa (JP)

(72) Inventor: Hiroki Shibata, Yokohama (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 295 days.

(21) Appl. No.: 15/551,138

(22) PCT Filed: Feb. 15, 2016

(86) PCT No.: PCT/JP2016/054299
§ 371 (c)(1),
(2) Date: Aug. 15, 2017

(87) PCT Pub. No.: WO2016/136521
PCT Pub. Date: Sep. 1, 2016

(65) Prior Publication Data
US 2018/0038594 A1    Feb. 8, 2018

(30) Foreign Application Priority Data

Feb. 24, 2015 (JP) ................. 2015-033560

(51) Int. Cl.
*F23R 3/06* (2006.01)
*F02C 7/18* (2006.01)
*F23R 3/46* (2006.01)
(Continued)

(52) U.S. Cl.
CPC ............... *F23R 3/06* (2013.01); *F01D 9/023* (2013.01); *F01D 25/12* (2013.01); *F02C 7/18* (2013.01);
(Continued)

(58) Field of Classification Search
CPC ...... F01D 9/023; F01D 25/12; F05D 2250/183
See application file for complete search history.

(56) References Cited

U.S. PATENT DOCUMENTS 4,004,056 A    1/1977  Carroll
2005/0047907 A1  3/2005  Nordlund
(Continued)

FOREIGN PATENT DOCUMENTS

JP    52-29462     3/1977
JP    2004-44538   2/2004
(Continued)

OTHER PUBLICATIONS

International Search Report dated Apr. 26, 2016 in International (PCT) Application No. PCT/JP2016/054299, with English translation.
Written Opinion of the International Searching Authority dated Apr. 26, 2016 in International (PCT) Application No. PCT/JP2016/054299, with English translation.

*Primary Examiner* — Arun Goyal
*Assistant Examiner* — Colin J Paulauskas
(74) *Attorney, Agent, or Firm* — Wenderoth, Lind & Ponack, L.L.P.

(57) ABSTRACT

A combustor cooling panel has a first channel and a second channel through which a cooling medium flows. Relative to an end zone in a longitudinal direction of the first channel, the second channel has: an overlapping zone that overlaps the end zone in an extension direction of the end zone by extending in the extension direction while being separated from the end zone in a circumferential direction intersecting the extension direction; and a non-overlapping zone that does not overlap the end zone in the extension direction. A bent portion that is bent toward the end zone in the circumferential direction is formed in the second channel.

20 Claims, 10 Drawing Sheets

(51) Int. Cl.
  *F23R 3/42*   (2006.01)
  *F23R 3/00*   (2006.01)
  *F01D 9/02*   (2006.01)
  *F01D 25/12*  (2006.01)
  *F23R 3/28*   (2006.01)

(52) U.S. Cl.
  CPC ............... *F23R 3/002* (2013.01); *F23R 3/28* (2013.01); *F23R 3/42* (2013.01); *F23R 3/46* (2013.01); *F05D 2220/32* (2013.01); *F05D 2240/35* (2013.01); *F05D 2250/183* (2013.01); *F05D 2250/312* (2013.01); *F05D 2250/314* (2013.01); *F05D 2260/202* (2013.01); *F23R 2900/00018* (2013.01)

(56) References Cited

U.S. PATENT DOCUMENTS

| | | | |
|---|---|---|---|
| 2006/0130484 A1* | 6/2006 | Marcum | F01D 9/023 60/752 |
| 2011/0146284 A1 | 6/2011 | Morimoto et al. | |
| 2013/0098063 A1 | 4/2013 | Mizukami et al. | |

FOREIGN PATENT DOCUMENTS

| | | |
|---|---|---|
| JP | 2005-105817 | 4/2005 |
| JP | 2010-261318 | 11/2010 |
| JP | 2012-77660 | 4/2012 |

\* cited by examiner

COMBUSTOR COOLING PANEL, TRANSITION PIECE AND COMBUSTOR INCLUDING THE SAME, AND GAS TURBINE INCLUDING COMBUSTOR

TECHNICAL FIELD

The present invention relates to a combustor cooling panel that defines a passage for combustion gas to flow through, a transition piece and a combustor including this combustor cooling panel, and a gas turbine including a combustor.

The present application claims priority based on Japanese Patent Application No. 2015-033560 filed on Feb. 24, 2015, the contents of which are incorporated herein by reference.

BACKGROUND ART

A combustor of a gas turbine includes a transition piece that defines a passage for combustion gas, and a fuel supply unit that supplies fuel along with air into this transition piece. Inside the transition piece, the fuel is combusted and combustion gas generated by the combustion of the fuel flows. Thus, an inner surface of the transition piece is exposed to ultrahigh-temperature combustion gas.

Therefore, the combustor disclosed in Patent Literature 1, for example, has a plurality of cooling channels formed between air inner surface and an outer surface of a combustion liner that defines a passage for combustion gas. Compressed air present outside the combustion liner flows as a cooling medium through these cooling channels.

CITATION LIST

Parent Literature

Patent Literature 1: Japanese Patent Laid-open No. 2012-077660

SUMMARY OF INVENTION

Technical Problem

A combustor cooling panel that forms a transition piece needs to be kept entirely under a certain temperature from the viewpoint of durability etc. Then, forming a large number of cooling channels with a large cross-sectional area inside the combustor cooling panel, or increasing the number of the cooling channels can keep the entire combustor cooling panel under a certain temperature. On the other hand, it is also desired to reduce as much as possible the flow rate of a cooling medium flowing through the cooling channels of the combustor cooling panel from the viewpoint of the operational cost etc.

Therefore, an object of the present invention is so provide a combustor cooling panel that can keep down the flow rate of a cooling medium while maintaining the durability, a transition piece and a combustor including this combustor cooling panel, and a gas turbine including a combustor.

Solution to Problem

According to a first aspect of the present invention to achieve the above object, a combustor cooling panel defines a circumference of a combustion gas passage for combustion gas to flow through from an upstream side to a downstream side in an axial direction in which an axis of a combustor extends. The combustor cooling panel includes: an inner surface capable of coming in contact with the combustion gas; an outer surface facing the opposite side from the inner surface; and a first channel and a second channel through which a cooling medium flows, the first channel and the second channel extending between the inner surface and the outer surface in a direction along the inner surface and the outer surface, at a constant distance from the inner surface in a thickness direction that is a direction from the inner surface toward the outer surface. Relative to an end zone of the first channel including an end thereof in a longitudinal direction, the second channel has: an overlapping zone that overlaps the end zone in an extension direction of the end zone by extending in a direction having a component of the extension direction while being separated from the end zone in an intersecting direction intersecting the extension direction; and a non-overlapping zone that does not overlap the end zone in the extension direction. A bent portion that is bent toward the end zone in the intersecting direction is formed in the second channel.

In this combustor cooling panel, the first channel and the second channel partially overlap each other in the extension direction. Thus, this combustor cooling panel has no channel-less area formed between the first channel and the second channel in the extension direction.

In this combustor cooling panel, the bent portion is formed in the second channel, which allows greater flexibility in arranging the non-overlapping zone of the second channel in the intersecting direction relative to the overlapping zone of the second channel. Moreover, in this combustor cooling panel, the bent portion is bent toward the end zone of the first channel in the intersecting direction. Thus, while the overlapping zone of the second channel is located at a position different from the position of the end zone of the first channel in the intersecting direction, an extension zone defined extending the end zone of the first channel in the extension direction, or the vicinity of this extension zone can be cooled by at least a part of the non-overlapping zone of the second channel.

In this combustor cooling panel, the distance from the inner surface to the first channel is constant, and the distance from the inner surface to the second channel is constant. Thus, the cooling medium flowing through the first channel can exert a nearly constant cooling effect on the inner surface, as well as the cooling medium flowing through the second channel can exert a nearly constant cooling effect on the inner surface. That the distant is constant here does not mean that the distance is exactly constant, but it means that this distance does not vary beyond a range of manufacturing error.

Thus, according to this combustor cooling panel, a part of the combustor cooling panel that is not sufficiently cooled can be reduced.

According to a second aspect of the present invention to achieve the above object, the combustor cooling panel of the first aspect includes two plates. Only a first plate of the two plates has grooves that form the first channel, and the second channel, and a second plate of the two plates is joined to the first plate so as to cover openings of the grooves in the first plate.

According to a third aspect of the present invention to achieve the above object, in the combustor cooling panel of the first or second aspect, the first channel and the second channel each have a single inlet that opens in the outer surface and a single outlet that opens in the inner surface.

According to a fourth aspect of the present invention to achieve the above object, the combustor cooling panel of the third aspect includes a plurality of the first channels and a plurality of the second channels. A side where the outlet of the first channel is located relative to the inlet of the first channel is the same for the plurality of first channels, and a side where the outlet of the second channel is located relative to the inlet of the second channel is the same for the plurality of second channels, and is the same as the side where the outlet of the first channel is located relative to the inlet of the first channel.

According to a fifth aspect of the present invention to achieve the above object, in the combustor cooling panel of the third or fourth aspect, one of the inlet and the outlet is formed in the end zone of the first channel, and the other of the inlet and the outlet is formed in the overlapping zone of the second channel.

According to a sixth aspect of the present invention to achieve the above object, in the combustor cooling panel of any one of the first to fifth aspects, a cross-sectional area of the first channel is constant, and a cross-sectional area of the second channel is constant.

According to a seventh aspect of the present invention to achieve the above object, in the combustor cooling panel of any one of the first to sixth aspects, the bent portion is formed in the non-overlapping zone of the second channel.

According to an eighth aspect of the present invention to achieve the above object, in the combustor cooling panel of any one of the first to seventh aspects, the second channel has a second bent portion that is formed in a zone inside the non-overlapping zone on the opposite side from the overlapping zone across a first bent portion being the bent portion, and that is bent toward the opposite side from bending of the first bent portion.

In this combustor cooling panel, two bent portions are formed in the non-overlapping zone of the second channel, which allows even greater flexibility in arranging the non-overlapping zone of the second channel in the intersecting direction relative to the overlapping zone of the second channel. Thus, according to this combustor cooling panel, the part of the combustor cooling panel that is not sufficiently cooled can be further reduced.

According to a ninth aspect, of the present invention to achieve the above object, in the combustor cooling panel of the eighth aspect, a zone inside the non-overlapping zone of the second channel on the opposite side from the overlapping zone across the second bent portion expends in the extension direction.

According to a tenth aspect of the present invention to achieve the above object, in the combustor cooling panel of the ninth aspect, the zone inside the non-overlapping zone of the second channel on the opposite side from the overlapping zone across the second bent portion is located in an extension zone defined by extending the end zone of the first channel in the extension direction.

In this combustor cooling panel, while the overlapping zone of the second channel is located at a position different from the position of the end zone of the first channel in the intersecting direction, the extension zone defined by extending the end zone of the first channel in the extension direction can be cooled by a part of the non-overlapping zone of the second channel.

According to an eleventh aspect of the present invention to achieve the above object, in the combustor cooling panel of any one of the first to tenth aspects, the first channel has a non-overlapping zone that continues to the end zone and does not overlap the overlapping zone of the second channel in the extension direction, and a bent portion that is bent toward the overlapping zone of the second channel in the intersecting direction is formed in the first channel.

This combustor cooling panel allows greater flexibility in arranging the non-overlapping zone of the first channel in the intersecting direction relative to the zone of the first channel that overlaps the overlapping zone of the second channel.

According to a twelfth (a) aspect of the present invention to achieve the above object, in the combustor cooling panel of the eleventh aspect, the first channel has a second bent portion that is formed in a zone inside the non-overlapping zone of the first channel on the opposite side from the end zone across a first bent portion being the bent portion, and that is bent toward the opposite side from bending of the first bent portion of the first channel.

This combustor cooling panel allows even greater flexibility in arranging the non-overlapping zone of the first channel in the intersecting direction relative to the zone of the first channel that overlaps the overlapping zone of the second channel.

According to a twelfth (b) aspect of the present invention to achieve the above object, in the combustor cooling panel of the twelfth (a) aspect, a zone inside the non-overlapping zone of the first channel on the opposite side from the end zone across the second bent portion of the first channel extends in the extension direction.

According to a twelfth aspect of the present invention to achieve the above object, in the combustor cooling panel of the eleventh aspect, the first channel has a second bent portion that is formed in a zone inside the non-overlapping zone of the first channel on the opposite side from the end zone across a first bent portion being the bent portion, and that is bent toward the opposite side from bending of the first bent portion of the first channel; and a zone inside the non-overlapping zone of the first channel on the opposite side from she end zone across the second bent portion of the first channel extends in the extension direction.

According to a twelfth (c) aspect of the present invention to achieve the above object, in the combustor cooling panel of the twelfth (b) or the twelfth aspect, the zone inside the non-overlapping zone of the first channel on the opposite side from the end zone across the second bent portion of the first channel may be located in an extension zone defined by extending the overlapping zone of the second channel in the extension direction.

According to a thirteenth aspect of the present invention to achieve the above object, the combustor cooling panel of any one of the above aspects includes: a plurality of the first channels arrayed in the intersecting direction; a plurality of the second channels arrayed in the intersecting direction; and a third channel overlapping the second channel in the extension direction. The overlapping zone of at least one of the second channels, and an overlapping zone of the third channel that overlaps the overlapping zone of the second channel in the extension direction, are located between a pair of first channels that are adjacent to each other in the intersecting direction among the plurality of first channels.

According to this combustor cooling panel, the total number of the second channels and the third channel that partially overlap the first channels in the extension direction can be set to be large relative to the number of the first channels.

According to a fourteenth aspect of the present invention to achieve the above object, in the combustor cooling panel of any one of the above aspects, the non-overlapping zone of the second channel is formed on the downstream side relative to the overlapping zone of the second channel.

In the combustor cooling panel, a downstream-side part is heated more easily than an upstream-side part. According to the combustor cooling panel having the third channel, an easily-heated area located on the downstream side relative to an area where the first channels are located can be cooled more than the area where the first channels are located by the second channels and the third channel located on the downstream side relative to the first channels.

According to a fifteenth aspect of the present invention to achieve the above object, in the combustor cooling panel of any one of the above aspects, the extension direction is the axial direction.

According to a sixteenth aspect of the present invention to achieve the above object, the combustor cooling panel of any one of the above aspects includes a welded part extending in the extension direction. The overlapping zone of the second channel is located on the opposite side from the welded part across the end zone of the first channel, and the bent portion of the second channel, is bent toward the welded part.

According to this combustor cooling panel, the overlapping zone of the second channel is located on the opposite side from the welded part across the end zone of the first channel, and yet the vicinity of the welded part can be cooled by the non-overlapping zone of the second channel.

According to a seventeenth aspect of the present invention to achieve the above object, the combustor cooling panel of the sixteenth aspect includes a side end channel through which the cooling medium flows, the side end channel being located between the first channel and the second channel on one side and the welded part on the other side in the intersecting direction, and extending in the extension direction.

According to this combustor cooling panel, areas along the welded part can be cooled.

According to an eighteenth aspect of the present invention to achieve the above object, in the combustor cooling panel of the seventeenth aspect a cross-sectional area of the side end channel is larger than a cross-sectional area of the first channel and a cross-sectional area of the second channel.

According to this combustor cooling panel, the areas along the welded part can be further cooled.

According to a nineteenth aspect of the present invention to achieve the above object, a transition piece includes the combustor cooling panel of any one of the above aspects.

Here, the transition piece includes one or more combustor cooling panels, and the one or more combustor cooling panels are joined together at edges.

According to a twentieth aspect of the present invention to achieve the above object, a combustor includes: the combustor cooling panel of any one of the above aspects; and a burner that jets fuel on a side of the inner surface of the combustor cooling panel, from the upstream side toward the downstream side of the combustor cooling panel.

According to a twenty-first aspect of the present invention to achieve the above object, a gas turbine includes the combustor, and a turbine driven by the combustion gas from the combustor.

Advantageous Effects of Invention

According to one aspect of the present invention, it is possible to keep down the flow rate of a cooling medium flowing through a cooling channel of a combustor cooling panel while maintaining the durability of the combustor cooling panel.

DESCRIPTION OF EMBODIMENTS

Various embodiments of the present invention will be described in detail below with reference to the drawings.

Embodiment of Gas Turbine

Figure 1:
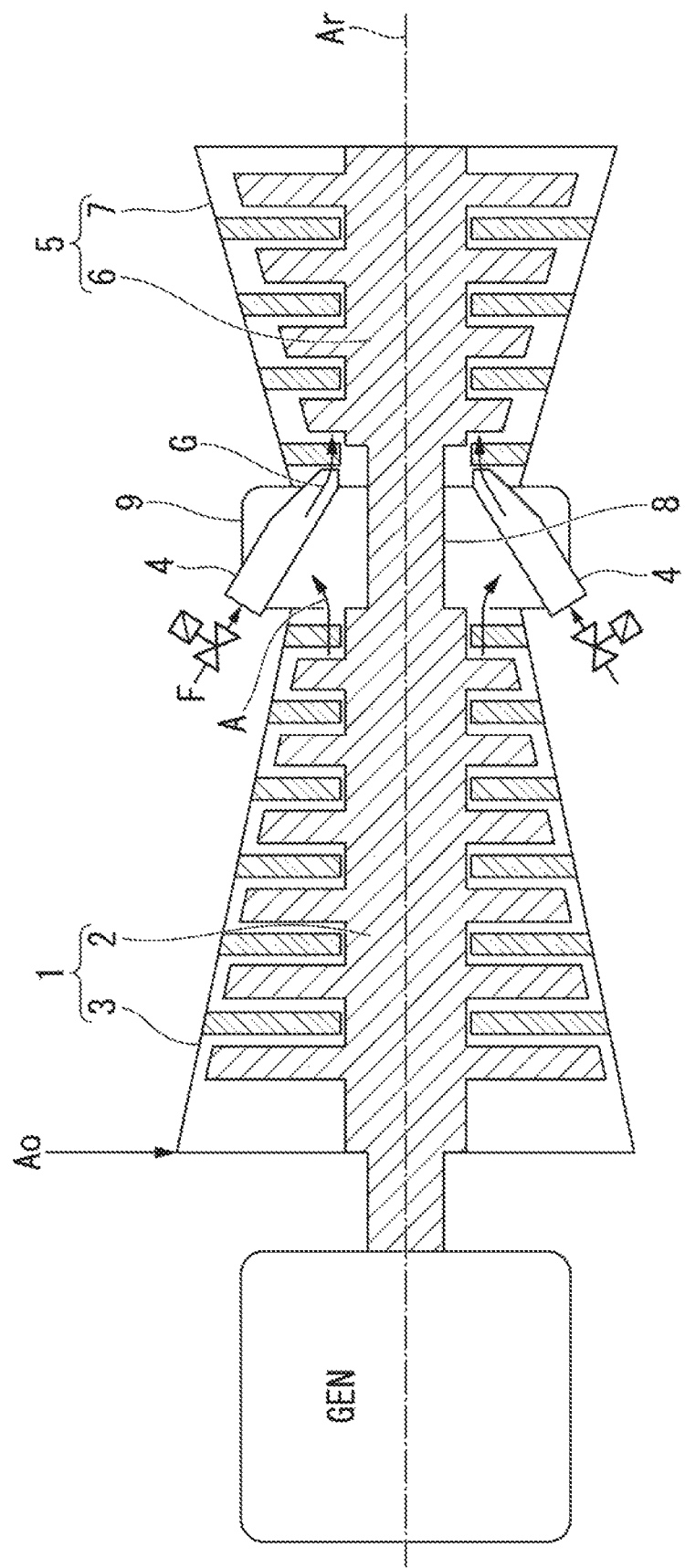
FIG. 1 is a schematic view showing a configuration of a gas turbine in an embodiment according to the present invention.

As shown in FIG. 1, a gas turbine of this embodiment includes a compressor 1 that generates compressed air A by compressing outside air Ao, a plurality of combustors 4 that generate combustion gas G by combusting fuel F in the compressed air A, and a turbine 5 driven by the combustion gas G.

The compressor 1 has a compressor rotor 2 that rotates around a rotational axis Ar, and a compressor casing 3 that rotatably covers the compressor rotor 2. The turbine 5 has a turbine rotor 6 that rotates around a rotational axis Ar, and a turbine casing 7 that rotatably covers the turbine rotor 6. The rotational axis Ar of the compressor rotor 2 and the rotational axis Ar of the turbine rotor 6 lie on the same straight line. The compressor rotor 2 and the turbine rotor 6 are coupled together to form a gas turbine rotor 8. The compressor casing 3 and the turbine casing 7 are coupled together to form a gas turbine casing 9.

For example, a rotor of a generator GEN is coupled to the gas turbine rotor 8. The plurality of combustors 4 are arrayed in a circumferential direction around the rotational axis Ar, housed inside the gas turbine casing 9, and fixed to the gas turbine casing 9.

Figure 2:
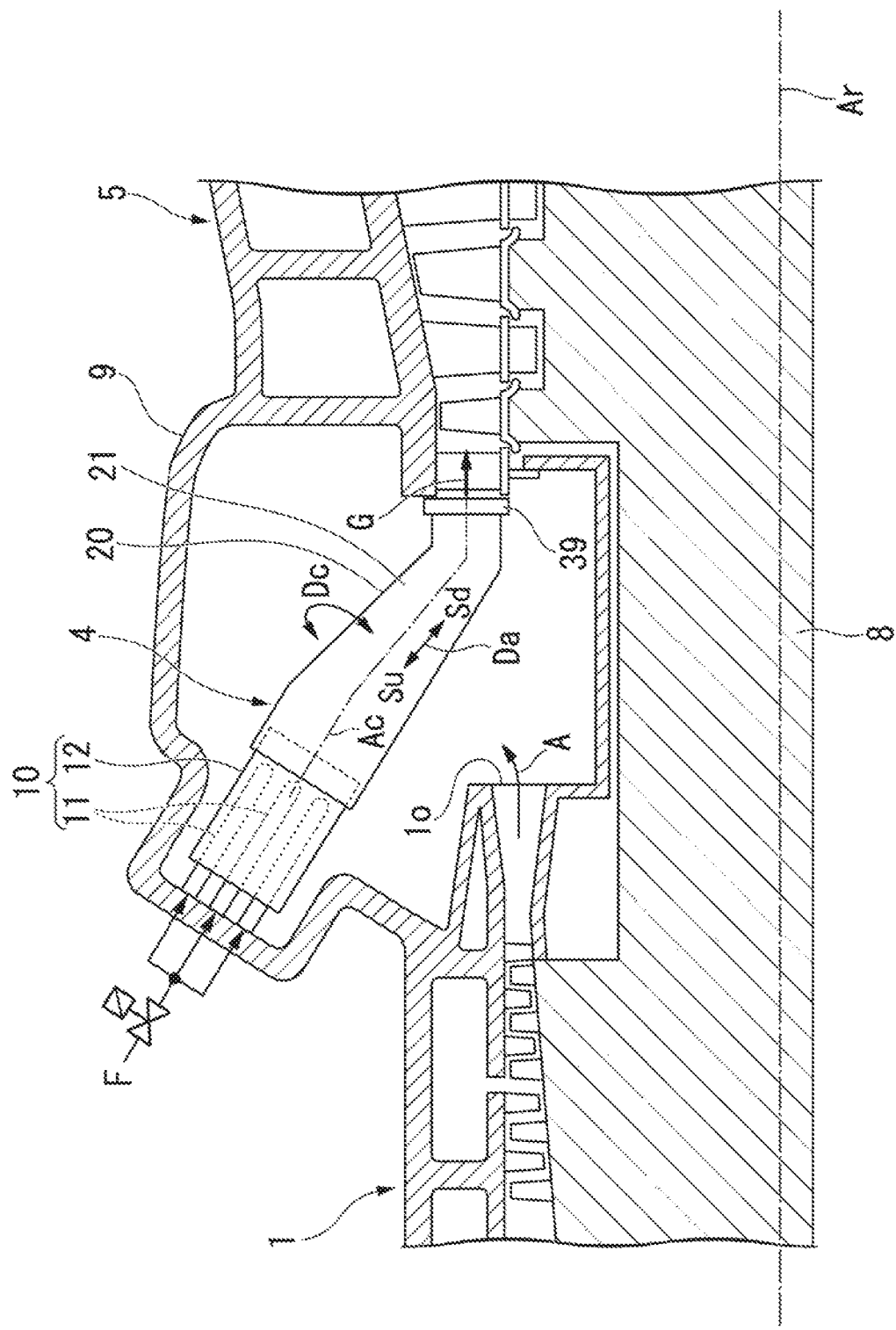
FIG. 2 is a sectional view around a combustor of the gas turbine in the embodiment according to the present invention.

As shown in FIG. 2, the combustor 4 has a transition piece 20 in which the fuel F is combusted and through which the combustion gas G generated as a result of the combustion of the fuel F is delivered to a combustion gas passage of the turbine 5, and a fuel supply unit 10 that delivers the fuel F and the air A into the transition piece 20. The combustors 4 are disposed inside the gas turbine casing 9, in a space containing the compressed air A compressed by the compressor 1.

The fuel supply unit 10 includes a plurality of burners 11 that jet the fuel F and the air A, and a burner holding cylinder 12 that holds the plurality of burners 11. The plurality of burners 11 are each supported by the burner holding cylinder 12 so as to be parallel to a combustor axis Ac. The plurality of burners 11 each jet the fuel F from one side toward the other side in an axial direction Da in which the combustor axis Ac extends. The transition piece 20 has a tubular shape extending in the axial direction Da, and defines the circumference of a combustion gas passage 21 for the combustion gas G to flow through. The transition piece 20 is formed around the combustor axis Ac. The combustion gas passage 21 narrows gradually from one side toward the other side in the axial direction Da. Accordingly, the cross-sectional area of the transition piece 20 in a cross-section perpendicular to the combustor axis Ac decreases gradually from one side toward the other side in the axial direction Da. Hereinafter, the one side in the axial direction Da and the other side in the axial direction Da will be referred to as an upstream side Su and a downstream side Sd, respectively. The circumferential direction of the combustion gas passage 21, i.e., the circumferential direction relative to the combustor axis Ac, will be referred to simply as a circumferential direction Dc.

The transition piece 20 is an example of a member that defines the combustion gas passage 21 of the combustor 4. The transition piece 20 is sometimes called a combustion liner. As will be described later, the transition piece 20 includes a combustor cooling panel. Therefore, this combustor cooling panel is also a member that defines the combustion gas passage 21 of the combustor 4. Thus, the combustion liner can also be said to include a combustor cooling panel 31.

The member of the combustor 4 that includes the combustor cooling panel is not limited to the transition piece 20, and may be any member that defines the combustion gas passage 21 of the combustor 4. For example, if a combustor basket, which is a member disposed on the upstream side of the combustion gas passage 21 of the transition piece 20, is the member that defines the combustion gas passage 21, this combustor basket may include the combustor cooling panel.

First Embodiment of Combustor Cooling Panel

A transition piece including a combustor cooling panel of a first embodiment will be described with reference to FIG. 3 to FIG. 7.

Figure 3:
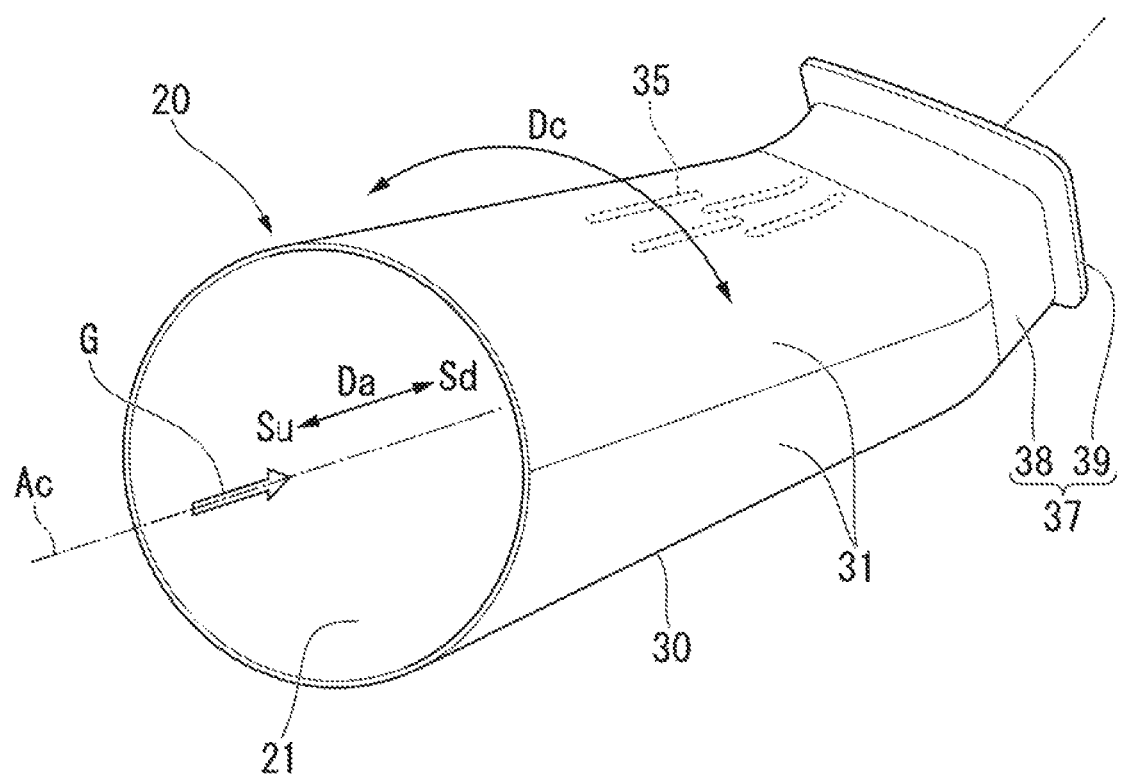
FIG. 3 is a perspective view of a transition piece in a first embodiment according to the present invention.

As shown in FIG. 3, the transition piece 20 of this embodiment has a body part 30 and an outlet flange part 37 joined to the body part 30 on the downstream side Sd.

The outlet flange part 37 has a tube 38 that has a tubular shape and defines a part of the combustion gas passage 21, and a flange 39 that is formed at a downstream end of the tube 38. As shown in FIG. 2, the flange 39 serves to connect the transition piece 20 to a first-stage vane of the turbine 5. For example, the tube 38 and the flange 39 are integrally molded by casting etc. to form the outlet flange part 37. A thermal barrier coating (TBC) layer (not shown) is formed on an inner surface of the tube 38.

The body part 30 is formed in a tubular shape by curving a plurality of combustor cooling panels 31, arranging the plurality of curved combustor cooling panels 31 in the circumferential direction Dc, and welding together the combustor cooling panels 31 at ends in the circumferential direction Dc. The body part 30 is composed of two combustor cooling panels 31 arranged in the circumferential direction Dc in the example shown in FIG. 3, but, for example, the body part 30 may instead be composed of three or more, for example, four combustor cooling panels 31 arranged in the circumferential direction Dc. Alternatively, the body part 30 may be formed by curving one combustor cooling panel 31 into a tubular shape and welding together the ends of the one combustor cooling panel 31.

Figure 5:
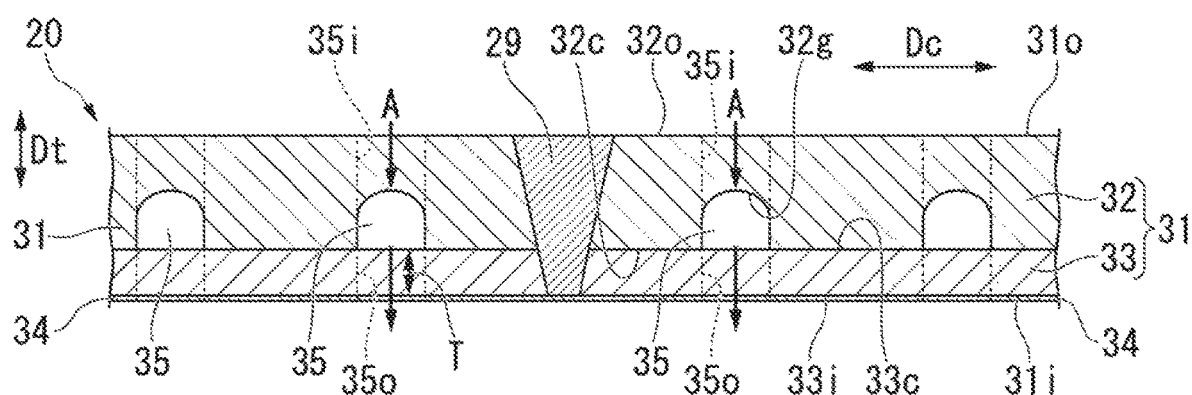
FIG. 5 is a sectional view of a main part of the transition piece in the first embodiment according to the present invention.

As shown in FIG. 5, the combustor cooling panel 31 has an outer plate 32 and an inner plate 33. Of a pair of surfaces of the outer plate 32 facing the opposite directions, one surface forms an outer surface 32o and the other surface forms a joint surface 32c. Of a pair of surfaces of the inner plate 33 facing the opposite directions, one surface forms a joint surface 33c and the other surface forms an inner surface 33i. The joint surface 32c of the outer plate 32 has a plurality of long grooves 32g recessed toward the outer surface 32o. By contrast, the inner plate 33 has no grooves equivalent to the long grooves 32g of the outer plate 32. The outer plate 32 and the inner plate 33 are joined together by brazing etc. at the joint surfaces 32c, 33c to form the combustor cooling panel 31. As the outer plate 32 and the inner plate 33 are joined together, openings of the plurality of long grooves 32g formed in the outer plate 32 are covered by the inner plate 33, and the inside of each of the plurality of long grooves 32g serves as a cooling channel 35.

The plurality of combustor cooling panels 31 are each disposed with the inner surface 33i of the inner plate 33 facing the inner circumferential side of the transition piece 20, the outer surface 32o of the outer plate 32 facing the outer circumferential side of the transition piece 20, and the longitudinal direction of the cooling channel 35 coinciding with the axial direction Da of the transition piece 20. As described above, the plurality of combustor cooling panels 31 are joined together at the ends in the circumferential direction Dc. As described above, a tube is formed as the plurality of combustor cooling panels 31 are joined together. A thermal barrier coating layer 34 is formed on an inner surface of this tube, i.e., on the inner surfaces 33i of the inner plates 33. Thus, the outer surfaces 32o of the outer plates 32 form an outer surface 31o of the transition piece 20, and a surface of the thermal barrier coating layer 34 forms an inner surface 31i of the transition piece 20. The cooling channels 35 extend in a direction along the inner surface 31i and the outer surface 31o of the transition piece 20.

The transition piece 20 has an inlet 35i leading from the outer surface 31o to the cooling channel 35. Moreover, the transition piece 20 has an outlet 35o leading from the inner surface 31i to the cooling channel 35. The inlet 35i is formed at one end of both ends in the longitudinal direction of the cooling channel 35, while the outlet 35o is formed at the other end of the cooling channel 35. Thus, the cooling channel 35 of this embodiment has a single inlet 35i and a single outlet 35o.

A distance T from the inner surface 33i to the plurality of cooling channels 35 in a thickness direction Dt of the combustor cooling panel 31 is the same at any position of the cooling channels 35 in the extension direction thereof. In other words, the distance T from the inner surface 33i to the plurality of cooling channels 35 in the thickness direction Dt is constant. The thickness direction Dt of the combustor cooling panel 31 refers to the direction front the inner surface 33i toward the outer surface 32o of the combustor cooling panel 31. The distance T from the inner surface 33i also refers to the shortest distance from the inner surface 33i. That the distance T is constant does not mean that the distance T is exactly constant, but it means that the distance T does not vary beyond a range of manufacturing error. The range of manufacturing error here is specifically a range of dimension of 0.1 times the plate thickness of the combustor cooling panel 31 or a range of dimension of 0.3 times the depth of the long groove 32g, whichever is larger.

The cross-sectional area of the plurality of cooling channels 35 is the same at any position of the cooling channels 35 in the extension direction thereof, except at the inlet 35i and the outlet 35o. In other words, the cross-sectional area of the plurality of cooling channels 35 is constant. That the cross-sectional area is constant does not mean that the cross-sectional area is exactly constant, but it means that the cross-sectional area does not vary beyond the range of manufacturing error.

As described above, the combustors 4 are disposed inside the gas turbine casing 9, in the space containing the compressed air A compressed by the compressor 1. Accordingly, the compressed air A inside the gas turbine casing 9 flows as a cooling medium into the cooling channels 35 through the inlets 35i formed in the outer surface 31o of the transition piece 20. The compressed air A flows out of the cooling channels 35 through the outlets 35o into the combustion gas passage 21 formed inside the transition piece 20.

Figure 4:
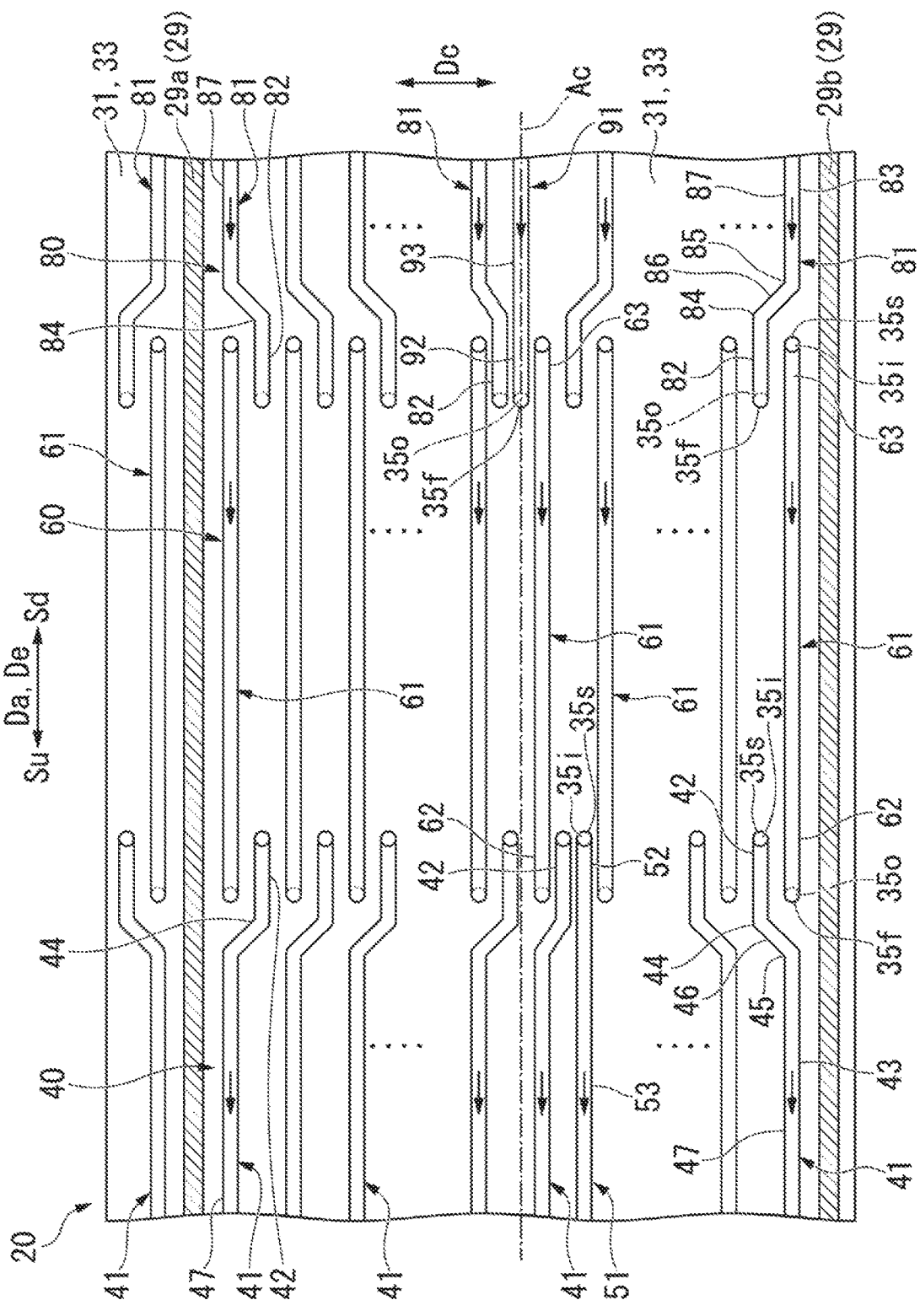
FIG. 4 is a schematic development of the transition piece in the first embodiment according to the present invention.

Next, the arrangement of the plurality of cooling channels 35 in the transition piece 20 will be described using FIG. 4. FIG. 4 is a schematic development, as seen from the inside of the transition piece 20, of the outer plate 32 of the body part 30 of the transition piece 20 developed on a plane.

Welded parts 29 of the plurality of combustor cooling panels 31 of the transition piece 20 are each formed on a line of intersection between an imaginary plane including the combustor axis Ac and the body part 30. Thus, the welded parts 29 substantially extend in the axial direction Da. To look at one combustor cooling panel 31, the welded parts 29 are formed along a pair of sides of the combustor cooling panel 31 that face each other in the circumferential direction Dc. Thus, one combustor cooling panel 31 has a first welded part 29a and a second welded part 29b as the welded parts 29 that are separated from each other in the circumferential direction Dc.

As described above, each combustor cooling panel 31 has the plurality of cooling channels 35. The longitudinal direction of each of the plurality of cooling channels 35 substantially coincides with an extension direction De of the welded part 29. The plurality of cooling channels 35 include: a plurality of bent A-channels 41 and one or more linear A-channels 51 constituting an A-channel group 40; a plurality of linear B-channels 61 constituting a B-channel group 60; and a plurality of bent C-channels 81 and one or more linear C-channels 91 constituting a C-channel group 80.

Each of the plurality of linear B-channels (first channels) 61 constituting the B-channel group 60 is a channel which has a straight-line shape and of which the extension direction De (longitudinal direction) substantially coincides with the extension direction De of the welded part 29. The plurality of linear B-channels 61 are separated from one another in the circumferential direction Dc and overlap one another in the extension direction De. Of both ends in the extension direction De (longitudinal direction) of the linear B-channel 61, a first end 35f that is one end is located on the upstream side Su relative to a second end 35s that is the other end. At the first end 35f of the linear B-channel 61, the outlet 35o of the linear B-channel 61 is formed. At the second end 35s of the linear B-channel 61, the inlet 35i of the linear B-channel 61 is formed. The side where the outlet 35o of the linear B-channel (first channel) 61 is located relative to the inlet 35i of the linear B-channel 61 is the same, i.e., the upstream side Su, for all the plurality of linear B-channels (first channels) 61.

The longitudinal direction of the plurality of bent C-channels 81 and one or more linear C-channels 91 constituting the C-channel group 80 substantially coincides with the extension direction De of the welded part 29. The plurality of bent C-channels 81 and one or more linear C-channels 91 are separated from one another in the circumferential direction Dc (intersecting direction) and overlap one another in the longitudinal direction.

Relative to a second end zone 63 of the linear B-channel 61 including the second end 35s thereof, the plurality of bent C-channels (second channels) 81 each have an overlapping zone 82 that overlaps the second end zone 63 in the extension direction De of the linear B-channel 61, and a non-overlapping zone 83 that does not overlap the second end zone 63 in the extension direction De of the linear B-channel 61. The overlapping zone 82 includes a first end 35f of the bent C-channel 81, is separated from the second end zone 63 in the circumferential direction Dc (intersecting direction) intersecting the extension direction De of the linear B-channel 61, and extends in the extension direction De of the linear B-channel 61. In the non-overlapping zone 83 of the bent C-channel 81, a first bent portion 84 that is bent toward the second end zone 63 of the linear B-channel 61 in the circumferential direction Dc, and a second bent portion 85 that is located on the downstream side Sd relative to the first bent portion 84 and bent toward the opposite side from bending of the first bent portion 84 are formed. Thus, in addition to the first bent portion 84 and the second bent portion 85, the non-overlapping zone 83 of the bent C-channel 81 has an inclined linear zone 86 between the first bent portion 84 and the second bent portion 85, and a linear zone 87 from the second bent portion 85 to a second end (not shown) of the bent C-channel 81. Relative to the overlapping zone 82 of the bent C-channel 81, the inclined linear zone 86 of the bent C-channel 81 forms an angle smaller than 90° toward the second end zone 63 of the linear B-channel 61. Relative to the inclined linear zone 86 of the bent C-channel 81, the linear zone 87 of the bent C-channel 81 forms the same angle as the bending angle of the first bent portion 84. However, the second bent portion 85 is bent toward the opposite side from the bending of the first bent portion 84 as described above. Thus, the extension direction De of the linear zone 87 of the bent C-channel 81 substantially coincides with the extension direction De of the overlapping zone 82 of the bent C-channel 81, the extension direction De of the linear B-channel 61, and the extension direction De of the welded part 29. The linear zone 87 of the bent C-channel 81 is located in an extension zone defined by extending the linear B-channel 61 in the extension direction De.

Of the plurality of bent C-channels 81, those bent C-channels 81 that are closer to the first welded part 29a in the circumferential direction Dc each have the linear zone 87 of the bent C-channel 81 located on the side of the first welded part 29a in the circumferential direction Dc relative to the overlapping zone 82 of the bent C-channel 81. Thus, the first bent portions 84 of those bent C-channels 81 closer to the first welded part 29a in the circumferential direction Dc are bent toward the first welded part 29a. On the other hand, of the plurality of bent C-channels 81, those bent C-channels 81 that are closer to the second welded part 29b in the circumferential direction Dc each have the linear zone 87 of the bent C-channel 81 located on the side of the second welded part 29b in the circumferential direction Dc relative to the overlapping zone 82 of the bent C-channel 81. Thus, the first bent portions 84 of those bent C-channels 81 closer to the second welded part 29*b* in the circumferential direction Dc are bent toward the second welded part 29*b*.

The longitudinal direction of the bent C-channel 81 coincides with the extension direction De of the linear zone 87 of the bent C-channel 81 and the extension direction De of the overlapping zone 82 of the bent C-channel 81. At the first end 35*f* of the bent C-channel 81, the outlet 35*o* of the bent C-channel 81 is formed. At the second end (not shown) of the bent C-channel 81, the inlet (not shown) of the bent C-channel 81 is formed. The side where the outlet 35*o* of the bent C-channel (second channel) 81 is located relative to the inlet of the bent C-channel 81 is the same, i.e., the upstream side Su, for all the plurality of bent C-channels (second channels) 81.

The linear C-channel (third channel) 91 is a channel having a straight-line shape and extending in the extension direction De of the linear B-channel 61. Thus, the extension direction De (longitudinal direction) of the linear C-channel 91 substantially coincides with the extension direction De of the linear B-channel 61, the extension direction De of the overlapping zone 82 of the bent C-channel 81, the extension direction De of the linear zone 87 of the bent C-channel 81, and the extension direction De of the welded part 29. As described above, the linear C-channel 91 overlaps the plurality of bent C-channels 81 in the longitudinal direction (extension direction De) of the linear C-channel 91. Thus, as with the bent C-channel 81, the linear C-channel 91 has an overlapping zone 92 that overlaps the second end zone 63 of the linear B-channel 61 in the extension direction De of the linear B-channel 61, and a non-overlapping zone 93 that does not overlap the second end zone 63 of the linear B-channel 61. At a first end 35*f* of the linear C-channel 91, the outlet 35*o* of the linear C-channel 91 is formed. At a second end (not shown) of the linear C-channel 91, the inlet (not shown) (if the linear C-channel 91 is formed. The side where the outlet 35*o* of the linear C-channel (third channel) 91 is located relative to the inlet of the linear C-channel 91 is the same, i.e., the upstream side Su, for all the plurality of linear C-channels (second channels) 91.

In this embodiment, the overlapping zone 82 of at least one bent C-channel (second channel) 81 and the overlapping zone 92 of at least one linear C-channel (third channel) 91 are located, at an interval in the circumferential direction Dc, between at least one pair of linear B-channels (first channels) 61 that are adjacent to each other in the circumferential direction Dc among the plurality of linear B-channels 61 arrayed in the circumferential direction Dc. Accordingly, in this embodiment, the number of the channels constituting the C-channel group 80 is larger than the number of the channels constituting the B-channel group 60.

In the case of this embodiment, the above-described bent C-channels 81 closer to the first welded part 29*a* are those bent C-channels 81 that are located on the side of the first welded part 29*a* from the linear C-channel 91. In the case of this embodiment, the above-described bent C-channels 81 closer to the second welded part 29*b* are those bent C-channels 81 that are located on the side of the second welded part 29*b* from the linear C-channel 91.

The longitudinal direction of the plurality of bent A-channels 41 and one or more linear A-channels 51 constituting the A-channel group 40 substantially coincides with the extension direction De of the welded part 29. The plurality of bent. A-channels 41 and one or more linear A-channels 51 are separated from one another in the circumferential direction De and overlap one another in the longitudinal direction.

Relative to a first end zone 62 of the linear B-channel 61 including the first end 35*f* thereof, the plurality of bent A-channels 41 each have an overlapping zone 42 that overlaps the first end zone 62 in the extension direction De of the linear B-channel 61, and a non-overlapping zone 43 that does not overlap the first end zone 62 in the extension direction De of the linear B-channel 61. The overlapping zone 42 includes a second end 35*s* of the linear A-channel 41, is separated from the first end zone 62 in the circumferential direction De (intersecting direction) intersecting the extension direction De of the linear B-channel 61, and extends in the extension direction De of the linear B-channel 61. In the non-overlapping zone 43 of the bent A-channel 41, a first bent portion 44 that is bent toward the first end zone 62 of the linear B-channel 61 in the circumferential direction Dc, and a second bent portion 45 that is located on the upstream side Su relative to the first bent portion 44 and bent toward the opposite side from bending of the first bent portion 44 are formed. Thus, in addition to the first bent portion 44 and the second bent portion 45, the non-overlapping zone 43 of the bent A-channel 41 has an inclined linear zone 46 between the first bent portion 44 and the second bent portion 45, and a linear zone 47 from the second bent portion 45 to the first end (not shown) of the bent A-channel 41. Relative to the overlapping zone 42 of the bent A-channel 41, the inclined linear zone 46 of the bent A-channel 41 forms an angle smaller than 90° toward the first end zone 62 of the linear B-channel 61. Relative to the inclined linear zone 46 of the bent A-channel 41, the linear zone 47 of the bent A-channel 41 forms the same angle as the bending angle of the first bent portion 44. However, the second bent portion 45 is bent toward the opposite side from the bending of the first bent portion 44 as described above. Thus, the extension direction De of the linear zone 47 of the bent A-channel 41 substantially coincides with the extension direction De of the overlapping zone 42 of the bent A-channel 41, the extension direction De of the linear B-channel 61, and the extension direction De of the welded part 29. The linear zone 47 of the bent A-channel 41 is located in an extension zone defined by extending the linear B-channel 61 in the extension direction De.

Of the plurality of bent A-channels 41, those bent A-channels 41 that are closer to the first welded part 29*a* in the circumferential direction Dc each have the linear zone 47 of the bent A-channel 41 located on the side of the first welded part 29*a* in the circumferential direction Dc relative to the overlapping zone 42 of the bent A-channel 41. Thus, the first bent portions 44 of those bent A-channels 41 closer to the first welded pan 29*a* in the circumferential direction Dc are bent toward the first welded part 29*a*. On the other hand, of the plurality of bent A-channels 41, those bent A-channels 41 that are closer to the second welded part 29*b* in the circumferential direction Dc each have the linear zone 47 of the bent A-channel 41 located on the side of the second welded part 29*b* in the circumferential direction Dc relative to the overlapping zone 42 of the bent A-channel 41. Thus, the first bent portions 44 of those bent A-channels 41 closer to the second welded part 29*b* in the circumferential direction Dc are bent toward the second welded part 29*b*.

The longitudinal direction of the bent A-channel 41 coincides with the extension direction De of the linear zone 47 of the bent A-channel 41 and the extension direction De of the overlapping zone 42 of the bent A-channel 41. At a first end (not shown) of the bent A-channel 41, the outlet (not shown) of the bent A-channel 41 is formed. At the second end 35*s* of the bent A-channel 41, the inlet 35*i* of the bent A-channel 41 is formed.

The linear A-channel 51 is a channel having a straight-line shape and extending in the extension direction De of the linear B-channel 61. Thus, the extension direction De (longitudinal direction) of the linear A-channel 51 coincides with the extension direction De of the linear B-channel 61, the extension direction De of the overlapping zone 42 of the bent A-channel 41, the extension direction De of the linear zone 47 of the bent A-channel 41, and the extension direction De of the welded part 29. As described above, the linear A-channel 51 overlaps the plurality of bent A-channels 41 in the longitudinal direction (extension direction De) of the linear A-channel 51. Thus, as with the bent A-channel 41, the linear A-channel 51 has an overlapping zone 52 that overlaps the first end zone 62 of the linear B-channel 61 in the extension direction De of the linear B-channel 61, and a non-overlapping zone 53 that does not overlap the first end zone 62 of the linear B-channel 61. At a first end (not shown) of the linear A-channel 51, the outlet (not shown) of the linear A-channel 51 is formed. At a second end 35s of the linear A-channel 51, the inlet 35i of the linear A-channel 51 is formed.

In this embodiment, the overlapping zone 42 of at least one bent A-channel 41 and the overlapping zone 52 of at least one linear A-channel 51 are located, at an interval in the circumferential direction Dc, between at least one pair of linear B-channels 61 that are adjacent to each other in the circumferential direction Dc among the plurality of linear B-channels 61 arrayed in the circumferential direction Dc.

In the case of this embodiment, the above-described bent A-channels 41 closer to the first welded part 29a are those bent A-channels 41 that are located on the side of the first welded part 29a from the linear A-channel 51. In the case of this embodiment, the above-described bent A-channels 41 closer to the second welded part 29b are those bent A-channels 41 that are located on the side of the second welded part 29b from the linear A-channel 51.

Next, two comparative examples about the transition piece will be described before the workings and effects of the transition piece 20 of this embodiment.

Figure 6:
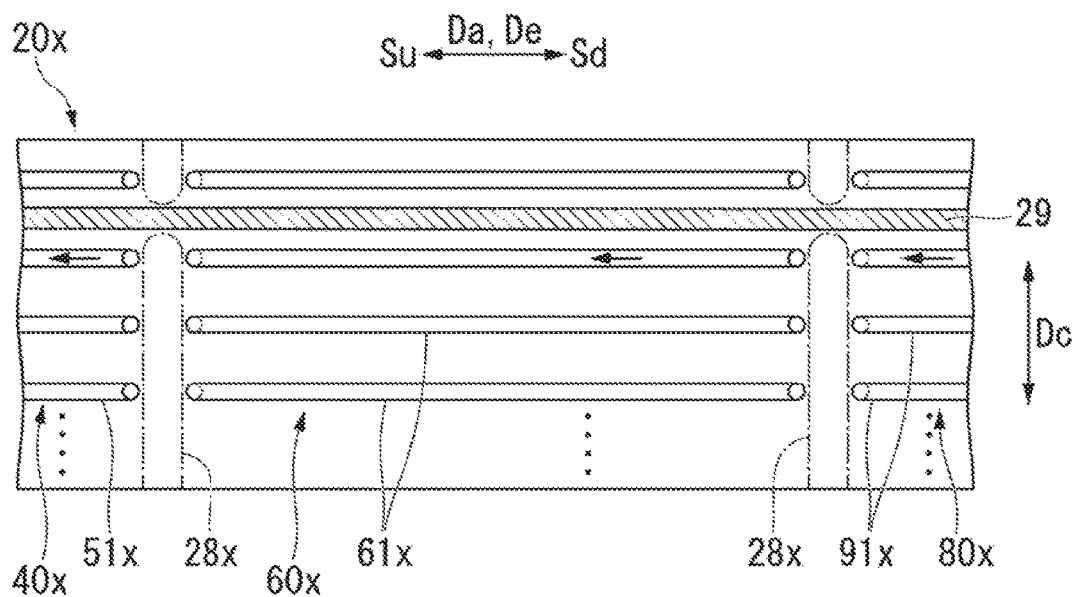
FIG. 6 is a schematic development of a transition piece in a first comparative example.

First, a first comparative example will be described using FIG. 6.

A transition piece 20x of the first comparative example has an A-channel group 40x having a plurality of linear A-channels 51x, a B-channel group 60x having a plurality of linear B-channels 61x, and a C-channel group 80x having a plurality of linear C-channels 91x.

Each of the linear A-channels 51x, the linear B-channels 61x, and the linear C-channels 91x is a channel having a straight-line shape and extending in the extension direction De of the welded part 29. Thus, the extension direction De of each of the linear A-channels 51x, the linear B-channels 61x, and the linear C-channels 91x substantially coincides with the extension direction De of the welded part 29.

The plurality of linear A-channels 51x are separated from one another in the circumferential direction Dc and overlap one another in the extension direction De. The plurality of linear B-channels 61x are separated from one another in the circumferential direction Dc and overlap one another in the extension direction De. The plurality of linear C-channels 91x are separated from one another in the circumferential direction Dc and overlap one another in the extension direction De.

The plurality of linear B-channels 61x are separated from all the linear A-channels 51x in the extension direction De. Thus, the plurality of linear B-channels 61x and the plurality of linear A-channels 51x do not overlap each other in the extension direction De. As a result, there is a channel-less area 28x where no channel is present between the B-channel group 60x and the A-channel group 40x. The channel-less area 28x spreads between the B-channel group 60x and the A-channel group 40x in the circumferential direction Dc intersecting the extension direction De.

The plurality of linear C-channels 91x are separated from all the linear B-channels 61x in the extension direction De. Thus, the plurality of linear C-channels 91x and the plurality of linear B-channels 61x do not overlap each other in the extension direction De. As a result, there is a channel-less area 28x where no channel is present between the C-channel group 80x and the B-channel group 60x. The channel-less area 28x spreads between the C-channel group 80x and the B-channel group 60x in the circumferential direction Dc intersecting the extension direction De.

Thus, in the transition piece 20x of the first comparative example, there is the channel-less areas 28x between the A-channel group 40x and the B-channel group 60x and between the B-channel group 60x and the C-channel group 80x. Accordingly, in the transition piece 20x of the first comparative example, the channel-less areas 28x may be not sufficiently cooled.

Figure 7:
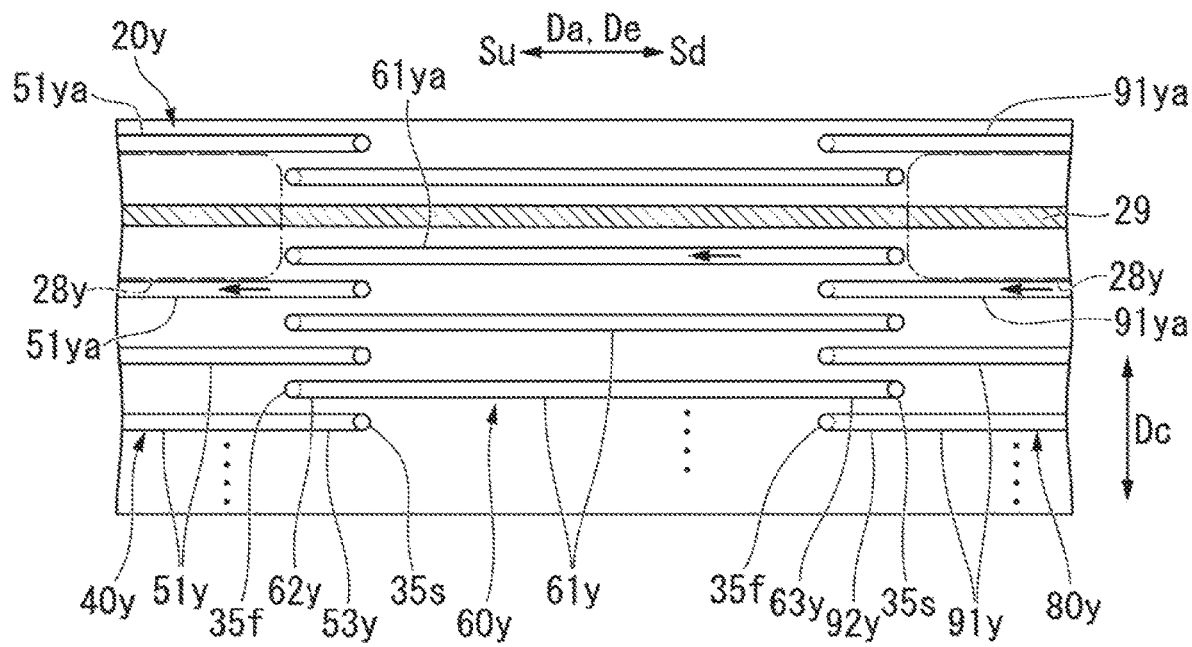
FIG. 7 is a schematic development of a transition piece in a second comparative example.

Next, a second comparative example will be described using FIG. 7.

A transition piece 20y of the second comparative example has an A-channel group 40y having a plurality of linear A-channels 51y, a B-channel group 60y having a plurality of linear B-channels 61y, and a C-channel group 80y having a plurality of linear C-channels 91y.

Each of the linear A-channels 51y, the linear B-channels 61y, and the linear C-channels 91y is a channel having a straight-line shape and extending in the extension direction De of the welded part 29. Thus, the extension direction De of each of the linear A-channels 51y, the linear B-channels 61y, and the linear C-channels 91y substantially coincides with the extension direction De of the welded part 29.

The plurality of linear A-channels 51y are separated from one another in the circumferential direction Dc and overlap one another in the extension direction De. The plurality of linear B-channels 61y are separated from one another in the circumferential direction Dc and overlap one another in the extension direction De. The plurality of linear C-channels 91y are separated from one another in the circumferential direction Dc and overlap one another in the extension direction De.

In the circumferential direction Dc, each of the plurality of linear B-channels 61y is disposed at a position different from the position of any of the plurality of linear A-channels 51y. First end zones 62y of the plurality of linear B-channels 61y, including first ends 35f thereof, overlap second end zones 53y of the plurality of linear A-channels 51y, including second ends 35s thereof, in the extension direction De. Thus, in this second comparative example, the first end zone 62y of one linear B-channel 61y is disposed between a pair of linear A-channels 51y that are adjacent to each other in the circumferential direction Dc among the plurality of linear A-channels 51y.

In the circumferential direction Dc, each of the plurality of linear C-channels 91y is disposed at a position different from the position of any of the plurality of linear B-channels 61y. First end zones 92y of the plurality of linear C-channels 91y, including first ends 35f thereof overlap second end zones 63y of the plurality of linear B-channels 61y, including second ends 35s thereof, in the extension direction De. Thus, in this second comparative example, the first end zone 92y of one linear C-channel 91y is disposed between a pair of linear B-channels 61y that are adjacent to each other in the circumferential direction Dc among the plurality of linear B-channels 61y.

Thus, in the second comparative example, the plurality of linear A-channels 51y and the plurality of linear B-channels 61y partially overlap each other in the extension direction De. As a result, no channel-less area 28x as in the first comparative example is formed between the A-channel group 40y and the B-channel group 60y. Moreover, in the second comparative example, the plurality of linear B-channels 61y and the plurality of linear C-channels 91y partially overlap each other in the extension direction De. Thus, no channel-less area 28x as in the first comparative example is formed between the B-channel group 60y and the C-channel group 80y, either.

However, suppose that a linear B-channel 61ya of the plurality of linear B-channels 61y that is closest to the welded part 29 in the circumferential direction Dc is brought as close to the welded part 29 as possible. In this case, a linear A-channel 51ya of the plurality of linear A-channels 51 that is closest to the welded part 29 in the circumferential direction Dc is located at a position farther from the welded part 29 than the linear B-channel 61ya is in the circumferential direction Dc. As a result, a comparatively large channel-less area 28y is formed between parts that do not overlap the linear B-channel 61y of two linear A-channels 51ya adjacent to each other across the welded part 29 in the circumferential direction Dc.

Moreover, suppose that the linear B-channel 61ya of the plurality of linear B-channels 61y that is closest to the welded part 29 in the circumferential direction Dc is brought as close to the welded part 29 as possible. In this case, a linear C-channel 91ya of the plurality of linear C-channels 91y that is closest to the welded part 29 in the circumferential direction Dc is located farther from the welded part 29 than the linear B-channel 61ya is in the circumferential direction Dc. As a result, a comparatively large channel-less area 28y is formed between parts that do not overlap the linear B-channel 61y of two linear C-channels 91ya adjacent to each other across the welded part 29 in the circumferential direction Dc.

Thus, in the second comparative example, the channel-less areas 28y are formed in some areas along the welded part 29. Accordingly, in the transition piece 20y of the second comparative example, the channel-less areas 28y may be not sufficiently cooled.

Next, the workings and effects of the transition piece 20 of this embodiment will be described.

The fuel F is jetted along with the compressed air A from the plurality of burners 11 of the fuel supply unit into the transition piece 20. The fuel F is combusted in the compressed air A. As a result of the combustion of the fuel F, the high-temperature combustion gas G is generated. The combustion gas G flows through the transition piece 20 toward the downstream side Sd, and flows into the combustion gas passage of the turbine 5.

The combustion of the fuel F progresses toward the downstream side Sd. Thus, the combustion gas passage 21 inside the transition piece 20 reaches a higher temperature on the downstream side Sd than on the upstream side Su. Accordingly, the transition piece 20 is more exposed to the high-temperature gas on the downstream side Sd than on the upstream side Su. Moreover, as described above, the combustion gas passage 21 of the transition piece 20 narrows gradually from the upstream side Su toward the downstream side Sd. Thus, the flow velocity of a gas inside the combustion gas passage 21 is higher on the downstream side Sd than on the upstream side Su. Accordingly, the transition piece 20 has a higher heat transfer coefficient for a gas on the downstream side Sd than on the upstream side Su.

Thus, the transition piece 20 is more exposed to the high-temperature gas on the downstream side Sd than on the upstream side Su. Moreover, having a higher heat transfer coefficient for a gas on the downstream side Sd than on the upstream side Su, the transition piece 20 is heated more easily on the downstream side Sd than on the upstream side Su.

Each of the plurality of cooling channels 35 of this embodiment has the inlet 35i at the second end 35s dust is the downstream end of the cooling channel 35, and has the outlet 35o at the first end 35f that is the upstream end of the cooling channel 35. Thus, the compressed air as a cooling medium flows from the downstream side Sd toward the upstream side Su through the plurality of cooling channels 35 of this embodiment. In this embodiment, therefore, an easily-heated part of the transition piece 20 on the downstream side Sd can be efficiently cooled.

In the transition piece 20 of this embodiment, the plurality of bent A-channels 41 and one or more linear A-channels 51 constituting the A-channel group 40 and the plurality of linear B-channels 61 constituting the B-channel group 60 partially overlap each other in the extension direction De. Moreover, in the transition piece 20 of this embodiment, the plurality of linear B-channels 61 constituting the B-channel group 60 and the plurality of bent C-channels 81 and one or more linear C-channels 91 constituting the C-channel group 80 partially overlap each other in the extension direction De. Thus, in the transition piece 20 of this embodiment, no channel-less area 28x spreading between the channel groups in the circumferential direction Dc as in the first comparative example is formed.

In the transition piece 20 of this embodiment, the bent A-channel 41 is provided with the first bent portion 44 and the second bent portion 45, and the linear zone 47 of the bent A-channel 41 is set to be close to one linear B-channel 61 in the circumferential direction Dc relative to the overlapping zone 42 of the bent A-channel 41. More precisely, the linear zone 47 of the bent A-channel 41 is located in an extension zone defined by extending one linear B-channel 61 in the extension direction De. Therefore, even if the linear B-channel 61 of the plurality of linear B-channels 61 that is closest to the welded part 29 in the circumferential direction Dc is brought as close to the welded part 29 as possible, the linear zone 47 of the bent A-channel 41 is located in the extension zone defined by extending the linear B-channel 61 in the extension direction De. Thus, as with the linear B-channel 61, the linear zone 47 of the bent A-channel 41 that does not overlap the linear B-channel 61 is also located as close to the welded part 29 as possible. Moreover, in the transition piece 20 of this embodiment, the bent C-channel 81 (second channel) is provided with the first bent portion 84 and the second bent portion 85, and the linear zone 87 of the bent C-channel 81 is set to be close to one linear B-channel 61 (first channel) in the circumferential direction Dc relative to the overlapping zone 82 of the bent C-channel 81. More precisely, the linear zone 87 of the bent C-channel 81 is located in an extension zone defined by extending the linear B-channel 61 in the extension direction De. Therefore, even if the linear B-channel 61 of the plurality of linear B-channels 61 that is closest to the welded part 29 in the circumferential direction Dc is brought as close to the welded part 29 as possible, the linear zone 87 of the bent C-channel 81 is located in the extension zone defined by extending the linear B-channel 61 in the extension direction De. Thus, as with the linear B-channel 61, the linear zone 87 of the linear C-channel 91 that does not overlap the linear B-channel 61 is also located as close to the welded part 29 as possible.

As has been described above, in this embodiment, some cooling channels 35 of the plurality of cooling channels 35 are provided with the bent portions, which makes it possible to eliminate or reduce the part that is not sufficiently cooled without significantly increasing the number of the channels compared with the first and second comparative examples. Moreover, in this embodiment, the distance T from the inner surface 33*i* to the plurality of cooling channels 35 is constant, so that the inner surface 33*i* can be cooled nearly evenly with the compressed air flowing through the plurality of cooling channels 35. Thus, this embodiment can keep down the flow rate of the compressed air supplied to the channels of the transition piece 20 while maintaining the durability of the transition piece 20.

In this embodiment, the number of the channels constituting the C-channel group 80 is larger than the number of the channels constituting the B-channel group 60. Thus, an area on the downstream side Sd subjected to harsher thermal conditions can be cooled more than an area on the upstream side Su. The number of the channels constituting the C-channel group 80 can be thus set to be larger than the number of the channels constituting the B-channel group 60, because the bent C-channels 81 of the C-channel group 80 are provided with the bent portions 84, 85, which allows the positions of the linear zones 87 of the bent C-channels 81 in the circumferential direction Dc to be changed as appropriate.

In this embodiment, the number of the channels constituting the A-channel group 40 is larger than the number of the channels constituting the B-channel group 60. As described above, basically the transition piece is subjected to harsher thermal conditions on the downstream side Sd than on the upstream side Su. Depending on the shape of the transition piece or accessories etc. provided around the transition piece, however, an area on the upstream side Su of the transition piece may be partially subjected to harsher thermal conditions, in such an area on the upstream side Su, it is preferable that the number of the channels constituting the A-channel group 40 disposed on the upstream side Su relative to the B-channel group 60 be set to be larger than the number of the channels constituting the B-channel group 60, as in this embodiment.

In this embodiment the number of the channels constituting the A-channel group 40 and the number of the channels constituting the C-channel group 80 are set to be larger than the number of the channels constituting the B-channel group 60. However, in a case where the thermal conditions in the area where the A-channel group 40 is disposed or the area where the C-channel group 80 is disposed are not so harsh, it is not necessary to set the number of the channels constituting the A-channel group 40 and the number of the channels constituting the C-channel group 80 to be larger than the number of the channels constituting the B-channel group 60. In this case, for example, one of the bent C-channel 81 and the linear C-channel 91 that are disposed between a pair of linear B-channels 61 adjacent to each other in the circumferential direction Dc may be omitted. Similarly, one of the bent A-channel 41 and the linear A-channel 51 that are disposed between a pair of linear B-channels 61 adjacent to each other in the circumferential direction Dc may be omitted.

Second Embodiment of Combustor Cooling Panel

A transition piece including a combustor cooling panel of a second embodiment will be described with reference to FIG. 8 and FIG. 9.

Figure 8:
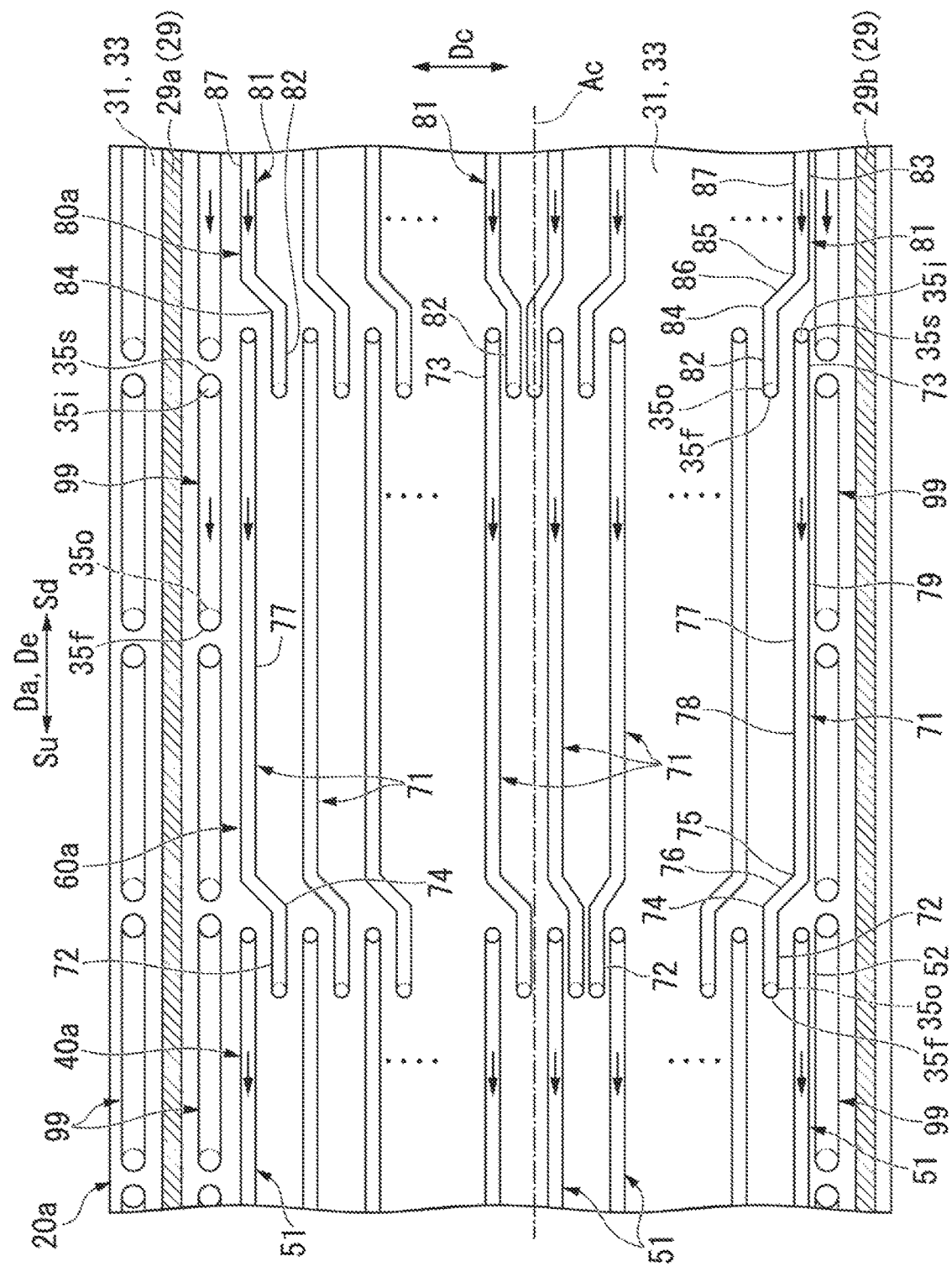
FIG. 8 is a schematic development of a transition piece in a second embodiment according to the present invention.

As shown in FIG. 8, the combustor cooling panel 31 forming a transition piece 20*a* of this embodiment also has the plurality of cooling channels 35 as in the first embodiment. The longitudinal direction of each of the plurality of cooling channels 35 substantially coincides with the extension direction De of the welded part 29. The plurality of cooling channels 35 include the plurality of linear A-channels 51 constituting an A-channel group 40*a*, a plurality of bent B-channels 71 constituting a B-channel group 60*a*, and the plurality of bent C-channels 81 constituting a C-channel group 80*a*. In this embodiment, the plurality of cooling channels 35 further include a plurality of side end channels 99 that are formed along the welded part 29.

Each of the plurality of linear A-channels 51 constituting the A-channel group 40*a* is a channel which has a straight-line shape and of which the extension direction De (longitudinal direction) substantially coincides with the extension direction De of the welded part 29. The plurality of linear A-channels 51 are separated from one another in the circumferential direction Dc and overlap one another in the extension direction De. Of both ends in the extension direction De (longitudinal direction) of the linear A-channel 51, at the first end 35*f* on the upstream side Su, the outlet 35*o* of the linear A-channel 51 is formed, and at the second end 35*s* on the downstream side Sd, the inlet 35*i* of the linear A-channel 51 is formed.

The longitudinal direction of the plurality of bent B-channels 71 constituting the B-channel group 60*a* substantially coincides with the extension direction De of the welded part 29. The plurality of bent B-channels 71 are separated from one another in the circumferential direction Dc and overlap one another in the longitudinal direction.

The bent B-channel 71 (first channel) has the same shape as the bent C-channel 81 of the first embodiment. Specifically, relative to the overlapping zone 52 of the linear A-channel 51, the bent B-channel 71 has an overlapping zone 72 that overlaps the overlapping zone 52 of the linear A-channel 51 in the extension direction De of the linear A-channel 51, and a non-overlapping zone 79 that does not overlap the overlapping zone 52 of the linear A-channel 51 in the extension direction De of the linear A-channel 51. The overlapping zone 72 includes a first end 35*f* of the bent B-channel 71, is separated from the overlapping zone 52 in the circumferential direction Dc (intersecting direction) intersecting the extension direction De of the linear A-channel 51, and extends in the extension direction De of the linear A-channel 51. In the non-overlapping zone 79 of the bent B-channel 71, a first bent portion 74 that is bent toward the overlapping zone 52 of the linear A-channel 51 in the circumferential direction Dc, and a second bent portion 75 that is located on the downstream side Sd relative to the first bent portion 74 and bent toward the opposite side from bending of the first bent portion 74 are formed. Thus, in addition to the first bent portion 74 and the second bent portion 75, the non-overlapping zone 79 of the bent B-channel 71 has an inclined linear zone 76 between the first bent portion 74 and the second bent portion 75, and a linear zone 77 from the second bent portion 75 to a second end 35*s* of the bent B-channel 71. The extension direction De of the linear zone 77 of the bent B-channel 71 substantially coincides with the extension direction De of the overlapping zone 72 of the bent B-channel 71, the extension direction De of the linear A-channel 51, and the extension direction De of the welded part 29. The linear zone 77 of the bent B-channel 71 is located in an extension zone defined by extending one linear A-channel 51 in the extension direction De.

Of the plurality of bent B-channels 71, those bent B-channels 71 that are closer to the first welded part 29*a* in the circumferential direction Dc each have the linear zone 77 of the bent B-channel 71 located on the side of the first welded part 29*a* in the circumferential direction Dc relative to the overlapping zone 72 of the bent B-channel 71. Thus, the first bent portions 74 of those bent B-channels 71 closer to the first welded part 29*a* in the circumferential direction Dc are bent toward the first welded part 29*a*. On the other hand, of the plurality of bent B-channels 71, those bent B-channels 71 that are closer to the second welded part 29*b* in the circumferential direction Dc each have the linear zone 77 of the bent B-channel 71 located on the side of the second welded part 29*b* in the circumferential direction Dc relative to the overlapping zone 72 of the bent B-channel 71. Thus, the first bent portions 74 of those bent B-channels 71 closer to the second welded part 29*b* in the circumferential direction Dc are bent toward the second welded part 29*b*.

The longitudinal direction of the bent B-channel 71 coincides with the extension direction De of the linear zone 77 of the bent B-channel 71 and the extension direction De of the overlapping zone 72 of the bent B-channel 71. At the first end 35*f* of the bent B-channel 71, the outlet 35*o* of the bent B-channel 71 is formed. At the second end 35*s* of the bent B-channel 71, the inlet 35*i* of the bent B-channel 71 is formed.

In this embodiment, the overlapping zones 72 of a plurality of bent B-channels 71 are located, at an interval in the circumferential direction Dc, between at least one pair of linear A-channels 51 that are adjacent to each other in the circumferential direction Dc among the plurality of linear A-channels 51 arrayed in the circumferential direction Dc. Thus, in this embodiment, the number of the channels constituting the B-channel group 60*a* is larger than the number of the channels constituting the A-channel group 40*a*.

The longitudinal direction of the plurality of bent C-channels 81 constituting the C-channel group 80*a* substantially coincides with the extension direction De of the welded part 29. The plurality of bent C-channels 81 are separated from one another in the circumferential direction Dc and overlap one another in the longitudinal direction.

The bent C-channel 81 (second channel) has the same shape as the bent C-channel 81 of the first embodiment. Specifically, relative to a second end zone 73 of the bent B-channel 71, the bent C-channel 81 has the overlapping zone 82 that overlaps the second end zone 73 of the bent B-channel 71 in the extension direction De of the second end zone 73, and the non-overlapping zone 83 that does not overlap the second end zone 73 of the bent B-channel 71 in the extension direction De of the second end zone 73. The overlapping zone 82 includes the first end 35*f* of the bent C-channel 81, is separated from the second end zone 73 in the circumferential direction Dc (intersecting direction) intersecting the extension direction De of the second end zone 73 of the bent B-channel 71, and extends in the extension direction De of the second end zone 73 of the bent B-channel 71. In the non-overlapping zone 83 of the bent C-channel 81, the first bent portion 84 that is bent toward the second end zone 73 of the bent B-channel 71 in the circumferential direction Dc, and the second bent portion 85 that is located on the downstream side Sd relative to the first bent portion 84 and bent toward the opposite side from bending of the first bent portion 84 are formed. Thus, in addition to the first bent portion 84 and the second bent portion 85, the non-overlapping zone 83 of the bent C-channel 81 has the inclined linear zone 86 between the first bent portion 84 and the second bent portion 85, and the linear zone 87 from the second bent portion 85 to the second end (not shown) of the bent B-channel 71. The extension direction De of the linear zone 87 of the bent C-channel 81 substantially coincides with the extension direction De of the overlapping zone 82 of the bent C-channel 81, the extension direction De of the linear zone 77 of the bent B-channel 71, and the extension direction De of the welded part 29. The linear zone 87 of the bent C-channel 81 (second channel) is located in an extension zone defined by extending the linear zone 77 of one bent B-channel 71 in the extension direction De. The overlapping zone 82 of the bent C-channel 81 (second channel) is located in an extension zone defined by extending the overlapping zone 72 of the bent B-channel 71 (first channel) in the extension direction De.

Of the plurality of bent C-channels 81, those bent C-channels 81 that are closer to the first welded part 29*a* in the circumferential direction Dc each have the linear zone 87 of the bent C-channel 81 located on the side of the first welded part 29*a* in the circumferential direction Dc relative to the overlapping zone 82 of the bent C-channel 81. Thus, the first bent portions 84 of those bent C-channels 81 closer to the first welded part 29*a* in the circumferential direction Dc are bent toward the first welded part 29*a*. On the other hand, of the plurality of bent C-channels 81, those bent C-channels 81 that are closer in the second welded part 29*b* in the circumferential direction Dc each have the linear zone 87 of the bent C-channel 81 located on the side of the second welded part 29*b* in the circumferential direction Dc relative to the overlapping zone 82 of the bent C-channel 81. Thus, the first bent portions 84 of those bent C-channels 81 closer to the second welded part 29*b* in the circumferential direction Dc are bent toward the second welded part 29*b*.

The longitudinal direction of the bent C-channel 81 coincides with the extension direction De of the linear zone 87 of the bent C-channel 81 and the extension direction De of the overlapping zone 82 of the bent C-channel 81. At the first end 35*f* of the bent C-channel 81, the outlet 35*o* of the bent C-channel 81 is formed. At the second end (not shown) of the bent C-channel 81, the inlet (not shown) of the bent C-channel 81 is formed.

In this embodiment, the overlapping zones 82 of a plurality of bent C-channels 81 (one channel of the plurality of bent C-channels 81 is the third channel and the other channels are the second channels) are located, at an interval in the circumferential direction Dc, between the second end zones 73 of at least one pair of bent B-channels 71 that are adjacent to each other in the circumferential direction Dc among the plurality of bent B-channels 71 (first channels) arrayed in the circumferential direction Dc. Thus, in this embodiment, the number of the channels constituting the C-channel group 80*a* is larger than the number of the channels constituting the B-channel group 60*a*.

In this embodiment, a zone of the bent B-channel 71 (first channel) that is located on the side of the A-channel group and does not overlap the overlapping zone 82 of the bent C-channel 81 (second channel) forms a non-overlapping zone 78 relative to the bent C-channel 81 (second channel). The bent B-channel 71 (first channel) of this embodiment has the first bent portion 74 and the second bent portion 75 formed in the non-overlapping zone 78.

Each of the plurality of side end channels 99 is a channel which has a straight-line shape and of which the extension direction De (longitudinal direction) substantially coincides with the extension direction De of the welded part 29. The plurality of side end channels 99 are arrayed in the extension direction De. The plurality of side end channels 99 arrayed in the extension direction De are formed between the A-channel group 40*a*, the B-channel group 60*a*, and the C-channel group 80*a* on one side and the welded part 29 on the other side. At a first end 35*f* of the side end channel 99, the outlet 35*o* of the side end channel 99 is formed. At a second end 35*s* of the side end channel 99, the inlet 35*i* of the side end channel 99 is formed.

Figure 9:
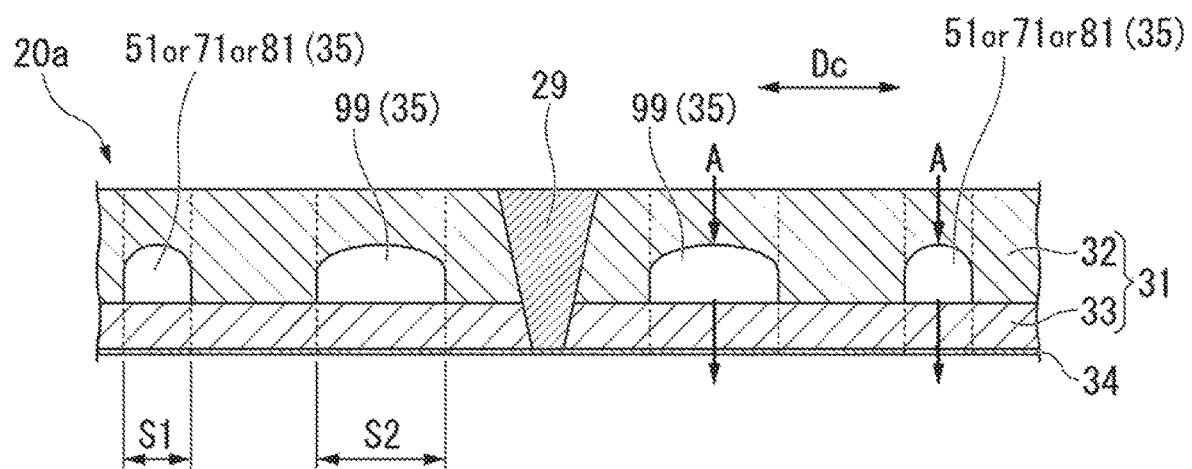
FIG. 9 is a sectional view of a main part of the transition piece in the second embodiment according to the present invention.

As shown in FIG. 9, the interval between a pair of cooling channels 35 with the welded part 29 disposed therebetween among pairs of cooling channels 35 adjacent to each other in the circumferential direction Dc is larger than the interval between other pairs of cooling channels 35. Thus, cooling performance of the compressed air per unit length in the circumferential direction Dc is lower in an area between the pair of cooling channels 35 with the welded part 29 disposed therebetween.

In this embodiment, therefore, a passage cross-sectional area S2 of the side end channel 99 that is the cooling channel 35 closest to the welded part 29 in the circumferential direction Dc is set to be larger than a passage cross-sectional area S1 of another cooling channel 35 adjacent to the side end channel 99 in the circumferential direction Dc. Moreover, in this embodiment, as shown in FIG. 8, the passage length of the side end channel 99 is set to be shorter than the passage length of another cooling channel 35 adjacent to the side end channel 99 in the circumferential direction Dc. Thus, in this embodiment, the cooling performance of the side end channel 99 is enhanced, and the area between a pair of side end channels 99 with the welded part 29 disposed therebetween can be cooled as equally well as areas between other pairs of cooling channels 35.

In the example shown in FIG. 9, a method of increasing the width dimension of the side end channel 99 in the circumferential direction Dc is adopted as a method of making the passage cross-sectional area S2 of the side end channel 99 larger than the passage cross-sectional area S1 of another cooling channel 35 adjacent to the side end channel 99 in the circumferential direction Dc. Alternatively, a method of increasing the height dimension of the side end channel 99 that is the length dimension thereof in the thickness direction of the combustor cooling panel 31 may be adopted as the method of making the passage cross-sectional area S2 of the side end channel 99 larger than the passage cross-sectional area S1 of another cooling channel 35 adjacent to the side end channel 99 in the circumferential direction Dc.

In the transition piece 20*a* of this embodiment, the plurality of linear A-channels 51 constituting the A-channel group 40*a* and the plurality of bent B-channels 71 constituting the B-channel group 60*a* partially overlap each other in the extension direction De. Moreover, in the transition piece 20*a* of this embodiment, the plurality of bent B-channels 71 constituting the B-channel group 60*a* and the plurality of bent C-channels 81 constituting the C-channel group 80*a* partially overlap each other in the extension direction De. Thus, in the transition piece 20*a* of this embodiment, as in the first embodiment, no channel-less area 28*x* spreading in the circumferential direction Dc between the channel groups as in the first comparative example is formed.

In the transition piece 20*a* of this embodiment, unlike the first embodiment, the linear A-channels 51 constituting the A-channel group 40*a* have a straight-line shape, while the bent B-channels 71 constituting the B-channel group 60*a* are each provided with the first bent portion 74 and the second bent portion 75, and the linear zone 77 of each bent B-channel 71 is set to be close to one linear A-channel 51 in the circumferential direction Dc relative to the overlapping zone 72 of the bent B-channel 71. More precisely, the linear zone 77 of the bent B-channel 71 is located in an extension zone defined by extending one linear A-channel 51 in the extension direction De. Therefore, even if the linear A-channel 51 of the plurality of linear A channels 51 that is closest to the welded part 29 in the circumferential direction Dc is brought as close to the welded part 29 as possible, the linear zone 77 of the bent B-channel 71 is located in an extension zone defined by extending the linear A-channel 51 in the extension direction De. Moreover, in the transition piece 20*a* of this embodiment, as in the first embodiment, the bent C-channels 81 (second channels) are each provided with the first bent portion 84 and the second bent portion 85, and the linear zone 87 of each bent C-channel 81 is set to be close to the linear zone 77 of one bent B-channel 71 (first channel) in the circumferential direction Dc relative to the overlapping zone 82 of the bent C-channel 81. Therefore, even if the bent B-channel 71 of the plurality of bent B-channels 71 that is closest to the welded part 29 in the circumferential direction Dc is brought as close to the welded part 29 as possible, the linear zone 87 of the bent C-channel 81 is located in an extension zone defined by extending the linear zone 77 of the bent B-channel 71 in the extension direction De. Thus, as with the linear zone 77 of the bent B-channel 71, the linear zone 87 of the bent C-channel 81 that does not overlap the bent B-channel 71 is also located as close to the welded part 29 as possible.

As has been described above, in this embodiment, too, some cooling channels 35 of the plurality of cooling channels 35 are provided with the bent portions, which makes it possible to eliminate or reduce the part that is not sufficiently cooled without significantly increasing the number of the channels compared with the first and second comparative examples. Accordingly, this embodiment can also keep down the flow rate of the compressed air supplied to the channels of the transition piece 20*a* while maintaining the durability of the transition piece 20*a*.

In this embodiment, the number of the channels constituting the B-channel group 60*a* disposed on the downstream side Sd relative to the A-channel group 40*a* is larger than the number of the channels constituting the A-channel group 40*a*. Moreover, in this embodiment, the number of the channels constituting the C-channel group 80*a* disposed on the downstream side Sd relative to the B-channel group 60*a* is larger than the number of the channels constituting the B-channel group 60*a*. Thus, the area on the downstream side Sd subjected to harsher thermal conditions can be cooled more than the area on the upstream side Su.

In this embodiment, in a case where the thermal conditions in the area where the B-channel group 60*a* is disposed are not much harsher than those in the area where the A-channel group 40*a* is disposed, it is not necessary to set the number of the channels constituting the B-channel group 60*a* to be larger than the number of the channels constituting the A-channel group 40*a*. Similarly, in a case where the thermal conditions in the area where the C-channel group 80*a* is disposed are not much harsher than those in the area where the B-channel group 60*a* is disposed, it is not necessary to set the number of the channels constituting the C-channel group 80*a* to be larger than the number of the channels constituting the B-channel group 60*a*.

Third Embodiment of Combustor Cooling Panel

Figure 10:
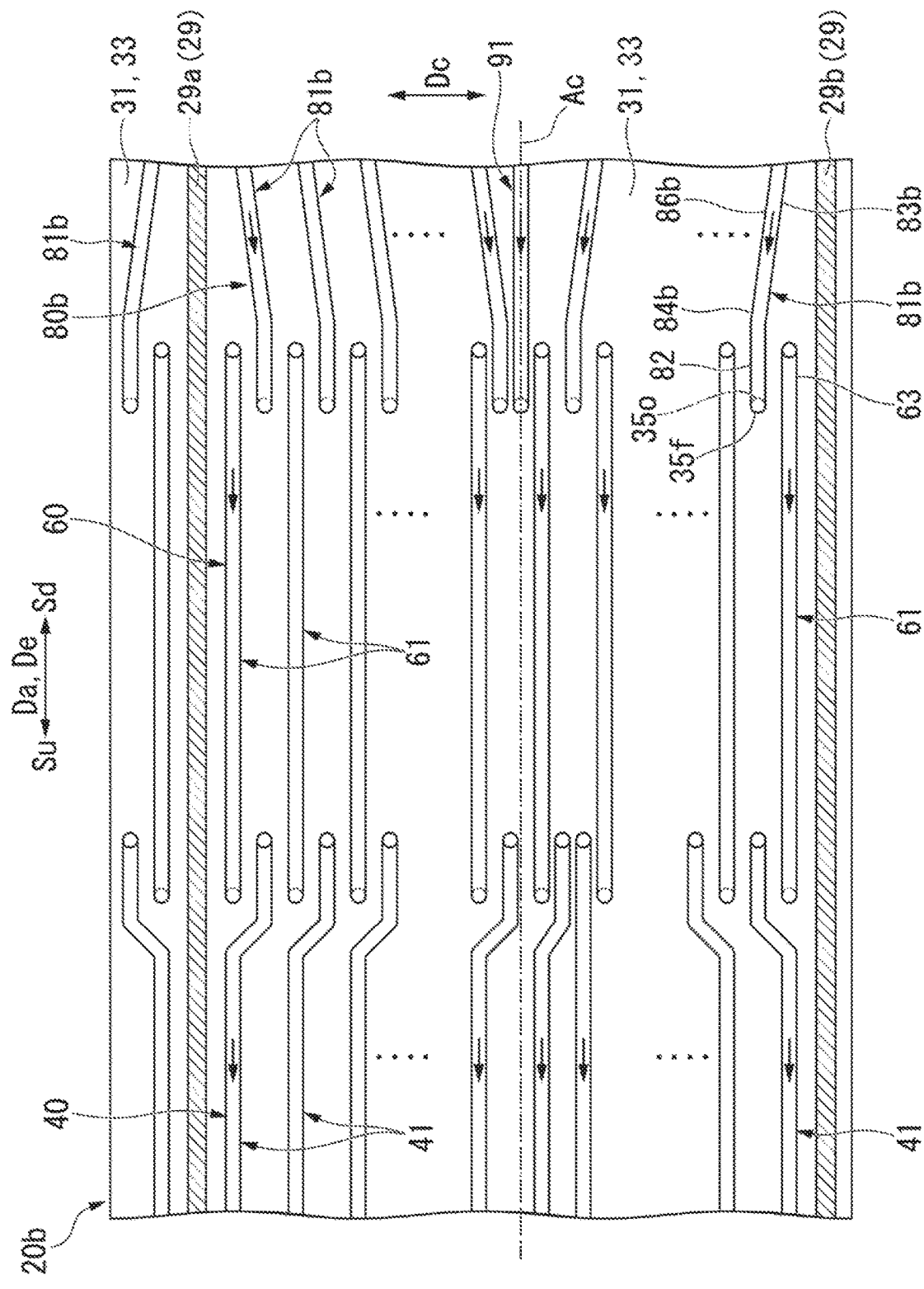
FIG. 10 is a schematic development of a transition piece in a third embodiment according to the present invention.

A transition piece including a combustor cooling panel of a third embodiment will be described with reference to FIG. 10.

The combustor cooling panel 31 forming a transition piece 20b of this embodiment also has the plurality of cooling channels 35 as in the first embodiment and the second embodiment. The longitudinal direction of each of the plurality of cooling channels 35 substantially coincides with the extension direction De of the welded part 29. As in the first embodiment, the plurality of cooling channels 35 include: the plurality of bent A-channels 41 and one or more linear A-channels 51 constituting the A-channel group 40; the plurality of linear B-channels 61 constituting the B-channel group 60; and a plurality of bent C-channels 81b and one or more linear C-channels 91 constituting a C-channel group 80b.

The channels constituting the A-channel group 40 of this embodiment are the same as the channels constituting the A-channel group 40 of the first embodiment. Moreover the channels constituting the B-channel group 60 of this embodiment are the same as the channels constituting the B-channel group 60 of the first embodiment. However, the bent C-channels 81b of the channels constituting the C-channel group 80b of this embodiment are different from the bent C-channels 81 of the first embodiment. Therefore, the best C-channels 81b of this embodiment will be described in detail below.

As with the bent C-channel 81 of the first embodiment, relative to the second end zone 63 of the linear B-channel 61, the bent C-channel 81b (second channel) of this embodiment has the overlapping zone 82 that overlaps the second end zone 63 in the extension direction De of the linear B-channel 61, and a non-overlapping zone 83b that does not overlap the second end zone 63 in the extension direction De of the linear B-channel 61, the overlapping zone 82 includes the first end 35f of the bent C-channel 81, is separated from the second end zone 63 in the circumferential direction Dc (intersecting direction) intersecting the extension direction De of the linear B-channel 61, and extends in the extension direction De of the linear B-channel 61. In the non-overlapping zone 83b of the bent C-channel 81, a bent portion 84b that is bent toward the second end zone 63 of the linear B-channel 61 in the circumferential direction Dc is formed. However, unlike the first embodiment only one bent portion 84b is formed in the non-overlapping zone 83b of the bent C-channel 81b of this embodiment. Thus, in addition to the one bent portion 84b, the non-overlapping zone 83b of the bent C-channel 81b has an inclined linear zone 86b from the bent portion 84b to the second end (not shown) of the bent C-channel 81b, but does not have the linear zone 87 of the first embodiment. Relative to the overlapping zone 82 of the bent C-channel 81b, the inclined linear zone 86b of the bent C-channel 81b of this embodiment forms an angle smaller than 90° toward the second end zone 63 of the linear B-channel 61 as in the first embodiment.

Thus, in the transition piece 20b of this embodiment, the bent C-channel 81b (second channel) is provided with only one bent portion 84b, and the inclined linear zone 86b of the bent C-channel 81b is set to be close to one linear B-channel 61 (first channel) in the circumferential direction Dc relative to the overlapping zone 82 of the bent C-channel 81b. Thus, in this embodiment, too, even if the linear B-channel 61 of the plurality of linear B-channels 61 that is closest to the welded part 29 in the circumferential direction Dc is brought as close to the welded part 29 as possible, the inclined linear zone 86b of the bent C-channel 81b that does not overlap the linear B-channel 61 can be set to be closer to the welded part 29 than the overlapping zone 82.

In this embodiment, too, as the bent C-channel 81b (second channel) is provided with the bent portion 84b, the number of the channels constituting the C-channel group 80b can be set to be larger than the number of the channels constituting the B-channel group 60 for the same reason as in the first embodiment.

Thus, as with the first embodiment, this embodiment can reduce the part that is not sufficiently cooled without significantly increasing the number of the channels, compared with the first and second comparative examples.

Thus, the bent channels of the above embodiments may be each provided with only one bent portion instead of two bent portions. However, if the bent channel is provided with only one bent portion, the flexibility in arrangement of the non-overlapping zone is reduced compared with if the bent channel is provided with two bent portions. Accordingly, if the bent channel is provided with only one bent portion, the part that is not sufficiently cooled cannot be much reduced compared with if the bent channel is provided with two bent portions.

The transition pieces 20b, 20 of this embodiment and the first embodiment do not have the side end channels of the transition piece 20a of the second embodiment. Alternatively, the transition pieces 20b, 20 of this embodiment and the first embodiment may also have side end channels similar to the side end channels 99 of the transition piece 20a of the second embodiment.

Various Modified Examples

In the above embodiments, all the cooling channels 35 in the body part 30 have the inlet 35i at the second end 35s that is the downstream end of the cooling channel 35, and have the outlet 35o at the first end 35f that is the upstream end of the cooling channel 35. Depending on the shape of the body part 30 or accessories etc. provided around the body part 30, however, some of the cooling channels 35 of the body part 30 may have the inlet at the first end 35f of the cooling channel 35 and the outlet at the second end 35s of the cooling channel 35. In particular, the channels constituting the A-channel group 40 that is disposed on the upstream side Su relative to the B-channel group 60 and the C-channel group 80, and is thus disposed in the area subjected to less harsh thermal conditions than the areas where the B-channel group 60 and the C-channel group 80 are disposed, may have the inlet at the first end 35f of the channel and the outlet at the second end 35s of the channel.

All the body parts 30 of the transition pieces of the above embodiments are formed by welding together the plurality of combustor cooling panels 31. However, the present invention may also be applied to a body part that has no welded part 29. Specifically, channels that have an overlapping zone and a non-overlapping zone, with a bent portion provided in the non-overlapping zone, may be formed in a body part that has no welded part 29.

In the above embodiments, relative to the first channel of the plurality of cooling channels 35, the second channel of the plurality of cooling channels 35 has the overlapping zone that overlaps the first channel in the extension direction of the first channel, and the non-overlapping zone that does not overlap the first channel in the extension direction, and the bent portion is formed only in the non-overlapping zone.

Figure 11:
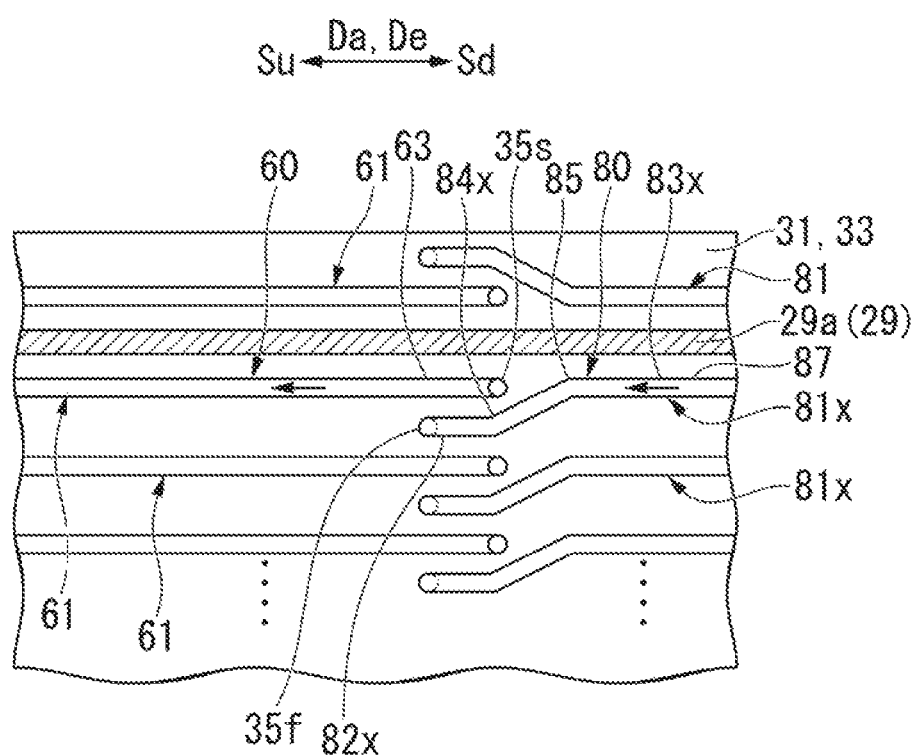
FIG. 11 is a schematic development of a main part of a transition piece in a modified example of the first embodiment according to the present invention.

Alternatively, the first bent portion may be formed in a part of the overlapping zone of the second channel on the side of the non-overlapping zone, and the second bent portion may be formed in the non-overlapping zone of the second channel. This aspect will be specifically described using FIG. 11 as a modified example of the transition piece 20 of the first embodiment.

Relative to the second end zone 63 of the linear B-channel 61 (first channel) including the second end 35s thereof, a plurality of bent C-channels (second channels) 81x constituting the C-channel group 80 each have an overlapping zone 82x that overlaps the second end zone 63 in the extension direction De of the linear B-channel 61, and a non-overlapping zone 83x that does not overlap the second end zone 63 in the extension direction De of the linear B-channel 61. The overlapping zone 82x includes the first end 35f of the bent C-channel 81, is separated from the second end zone 63 in the circumferential direction Dc (intersecting direction) intersecting the extension direction De of the linear B-channel 61, and extends in a direction including a component of the extension direction De of the linear B-channel 61. In a part of the overlapping zone 82x on the side of the non-overlapping zone 83x, a first bent portion 84x that is bent toward the second end zone 63 of the linear B-channel 61 in the circumferential direction Dc is formed. Moreover, in the non-overlapping zone 83x, the second bent portion 85 that is located on the downstream side Sd relative to the first bent portion 84x and bent toward the opposite side from bending of the first bent portion 84x is formed.

Basically the same effects as in the first embodiment can be achieved when the first bent portion 84x is thus formed in the overlapping zone 82x.

The above embodiments are examples where the compressed air A is used as a cooling medium. Alternatively, for example, steam may be used as a cooling medium. In this case, both the inlet 35i and the outlet 35o of the cooling channel 35 are formed in the outer surface 31o of the transition piece 20. In the case where the compressed air A is used as a cooling medium, if the transition piece 20 is to be cooled by a closed air-cooling method, both the inlet 35i and the outlet 35o of the cooling channel 35 are formed in the outer surface 31o of the transition piece 20.

In the above embodiments, the body pan 30 is formed by the combustor cooling panel 31 that is formed by a composite plate having the outer plate 32 and the inner plate 33. Alternatively the body part may be formed by a single plate instead of a composite plate.

In the above embodiments, the cross-sectional area of all the cooling channels 35 is the same at any position in the axial direction Da. Alternatively, the cross-sectional area of some of the cooling channels 35 may be varied according to the position in the axial direction Da.

INDUSTRIAL APPLICABILITY

In one aspect according to the present invention, it is possible to keep down the flow rate of a cooling medium flowing through a cooling channel of a combustor cooling panel while maintaining the durability of the combustor cooling panel.

REFERENCE SIGNS LIST

1 Compressor
4 Combustor
5 Turbine
8 Gas turbine rotor
9 Gas turbine casing
10 Fuel supply unit
20, 20a, 20b Transition piece (combustion liner)
21 Combustion gas passage
29 Welded part
29a First welded part
29b Second welded part
30 Body part
31 Combustor cooling panel
31i Inner surface
31o Outer surface
32 Outer plate
33 Inner plate
34 Thermal barrier coating layer
35 Cooling channel
35i Inlet
35o Outlet
35f First end
35s Second end
40, 40a A-channel group
41 Bent A-channel
42 Overlapping zone
43 Non-overlapping zone
44 First bent portion
45 Second bent portion
46 Inclined linear zone
47 Linear zone
51 Linear A-channel
52 Overlapping zone
53 Non-Overlapping zone
60, 60a B-channel group
61 Linear B-channel (first channel)
62 First end zone
63 Second end zone (or simply end zone)
71 Bent B-channel (first channel)
72 Overlapping zone
78, 79 Non-overlapping zone
74 First bent portion
75 Second bent portion
76 Inclined linear zone
77 Linear zone
80, 80a, 80b C-channel group
81, 81b, 81x Bent C-channel (second channel)
82, 82x Overlapping zone
83, 83b, 83x Non-overlapping zone
84, 84x First bent portion (or simply bent portion)
84b Bent portion
85 Second bent portion
86, 86b Inclined linear zone
87 Linear zone
91 Linear C-channel (third channel)
92 First end zone
93 Second end zone
99 Side end channel

The invention claimed is:

1. A combustor panel that defines a circumference of a combustion gas passage for combustion gas to flow through from an upstream side to a downstream side in an axial direction in which an axis of a combustor extends, the combustor cooling panel comprising:
an inner surface capable of coming in contact with the combustion gas;
an outer surface facing an opposite side from the inner surface; and
a first channel and a second channel through which a cooling medium flows, the first channel and the second channel extending between the inner surface and the outer surface in a direction along the inner surface and the outer surface, at a constant distance from the inner surface in a thickness direction that is a direction from the inner surface toward the outer surface, wherein
relative to an end zone of the first channel including an end thereof in an extension direction, the second channel has: an overlapping zone that overlaps the end zone in the extension direction of the end zone by extending in a direction having a component of the extension direction while being separated from the end zone in an intersecting direction intersecting the extension direction; and a non-overlapping zone that does not overlap the end zone in the extension direction, and the second channel extending in an upstream direction forming a first bent portion in a first direction chosen from one of clockwise direction or counter clockwise direction, the second channel further forming a second bent portion as it extends in the upstream direction in a second direction opposite of the first direction chosen from other of the clockwise direction or the counter clockwise direction.

2. The combustor cooling panel according to claim 1, comprising two plates, wherein only a first plate of the two plates has grooves that form the first channel and the second channel, and a second plate of the two plates is joined to the first plate so as to cover openings of the grooves in the first plate.

3. The combustor cooling panel according to claim 1, wherein the first channel and the second channel each have a single inlet that opens in the outer surface and a single outlet that opens in the inner surface.

4. The combustor cooling panel according to claim 3, comprising:

a plurality of the first channels; and a plurality of the second channels, wherein each of the plurality of the first channels has a single inlet and a single outlet in the extension direction, each of the plurality of the second channels has a single inlet and a single outlet in the extension direction, the single inlet of each first channel is positioned at a same side relative to the single outlet of each first channel among the plurality of the first channels in the extension direction, the single inlet of each second channel is positioned at a same side relative to the single outlet of each second channel among the plurality of the second channels in the extension direction, and the single inlet of each first channel and the single inlet of each second channel are positioned at the same side relative to the single outlet of each first channel and the single outlet of each second channel in the extension direction, respectively.

5. The combustor cooling panel according to claim 3, wherein one of the single inlet and the single outlet is formed in the end zone of the first channel, and other of the single inlet and the single outer is formed in the overlapping zone of the second channel.

6. The combustor cooling panel according to claim 1, wherein a cross-sectional area of the first channel is constant, and a cross-sectional area of the second channel is constant.

7. The combustor cooling panel according to claim 1, wherein the first bent portion is formed in the non-overlapping zone of the second channel.

8. The combustor cooling panel according to claim 1, wherein a zone inside the non-overlapping zone of the second channel on an opposite side from the overlapping zone with respect to the second bent portion extends in the extension direction.

9. The combustor cooling panel according to claim 8, wherein the zone inside the non-overlapping zone of the second channel on the opposite side from the overlapping zone across the second bent portion is located in an extension zone defined by extending the end zone of the first channel in the extension direction.

10. The combustor cooling panel according to claim 1, wherein the first channel has a non-overlapping zone that continues to the end zone and does not overlap the overlapping zone of the second channel in the extension direction, and the first channel has a first bent portion that is bent toward the overlapping zone of the second channel in the intersecting direction.

11. The combustor cooling panel according to claim 10, wherein the first channel has a second bent portion that is formed in a zone inside the non-overlapping zone of the first channel, the second bent portion of the first channel is formed in a different position that the first bent portion of the first channel in the extension direction, the second bent portion is bent in an opposite direction with respect to a direction in which the first bent portion formed in the first channel is bent, the second bent portion is formed at an opposite side of the end zone with respect to the first bent portion formed in the first channel in the extension direction, and the non-overlapping zone of the first channel is formed on the opposite side of the end zone with respect to the second bent portion of the first channel and the non-overlapping zone of the first channel extends in the extension direction.

12. The combustor cooling panel according to claim 1, comprising:

a plurality of the first channels arrayed in the intersecting direction;

a plurality of the second channels arrayed in the intersecting direction; and a third channel overlapping at least one of the second channels in the extension direction, wherein the overlapping zone of the at least one of the second channels, and an overlapping zone of the third channel that overlaps the overlapping zone of the second channel in the extension direction, are located between a pair of first channels that are adjacent to each other in the intersecting direction among the plurality of first channels.

13. The combustor cooling panel according to claim 1, wherein the non-overlapping zone of the second channel is formed on the downstream side relative to the overlapping zone of the second channel.

14. The combustor cooling panel according to claim 1, wherein the extension direction is the axial direction.

15. The combustor cooling panel according to claim 1, comprising a welded part extending in the extension direction, wherein the overlapping zone of the second channel is located on an opposite side from the welded part with respect to the end zone of the first channel in the intersecting direction, and the first bent portion of the second channel is bent toward the welded part.

16. The combustor cooling panel according to claim 15, comprising a side end channel through which the cooling medium flows, the side end channel being located between the first channel and the second channel on one side and the welded part on an other side in the intersecting direction, and extending in the extension direction.

17. The combustor cooling panel according to claim 16, wherein a cross-sectional area of the side end channel is larger than a cross-sectional area of the first channel and a cross-sectional area of the second channel.

18. A transition piece comprising the combustor cooling panel according to claim 1.

19. A combustor comprising:
the combustor cooling panel according to claim 1; and
a burner that jets fuel on a side of the inner surface of the combustor cooling panel, from the upstream side toward the downstream side of the combustor cooling panel.

20. A gas turbine comprising:
the combustor according to claim 19; and
a turbine driven by the combustion gas from the combustor.

\* \* \* \* \*